United States Patent
Takeda et al.

(10) Patent No.: US 11,558,821 B2
(45) Date of Patent: Jan. 17, 2023

(54) OPEN LOOP FEEDBACK POWER CONTROL FOR MULTICAST TRANSMISSIONS

(71) Applicant: QUALCOMM incorporated, San Diego, CA (US)

(72) Inventors: Kazuki Takeda, Tokyo (JP); Le Liu, Fremont, CA (US); Alberto Rico Alvarino, San Diego, CA (US); Wanshi Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 104 days.

(21) Appl. No.: 17/066,666

(22) Filed: Oct. 9, 2020

(65) Prior Publication Data

US 2021/0112500 A1  Apr. 15, 2021

Related U.S. Application Data

(60) Provisional application No. 62/914,869, filed on Oct. 14, 2019.

(51) Int. Cl.
*H04W 52/10* (2009.01)
*H04W 52/32* (2009.01)
(Continued)

(52) U.S. Cl.
CPC ........... *H04W 52/10* (2013.01); *H04L 5/0055* (2013.01); *H04W 52/242* (2013.01); *H04W 52/322* (2013.01); *H04W 72/1289* (2013.01)

(58) Field of Classification Search
None
See application file for complete search history.

(56) References Cited

U.S. PATENT DOCUMENTS

| | | | |
|---|---|---|---|
| 2011/0038299 A1* | 2/2011 | Sugawara | H04L 12/189 370/312 |
| 2013/0114561 A1* | 5/2013 | Simonsson | H04L 1/1887 370/328 |
| 2022/0039021 A1* | 2/2022 | Ryu | H04W 52/383 |

OTHER PUBLICATIONS

Huawei, et al., "Power Control and Power Sharing for V2X Sidelink", 3GPP Draft, 3GPP TSG RAN WG1 Meeting #97, R1-1906598, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051728049, 6 pages, Retrieved from the Internet: URL: http://www.3gpp.org/ftp/Meetings%5F3GPP%5FSYNC/RAN1/Docs/R1%2D1906598%2Ezip [retrieved on May 13, 2019] pp. 1-5.

(Continued)

*Primary Examiner* — James P Duffy
(74) *Attorney, Agent, or Firm* — Holland & Hart LLP

(57) ABSTRACT

Methods, systems, and devices for wireless communications are described. In one example, a user equipment (UE) may be configured to receive a control message scheduling a multicast transmission, and the UE may identify an open loop power control parameter for transmitting acknowledgment feedback responsive to the multicast transmission. The identification of the open loop power control parameter may be based on the transmission being multicast to a plurality of UEs, and in some cases a UE may identify an open loop power control parameter that is different than an open loop power control parameter associated with feedback responsive to unicast transmissions. In various examples, open loop power control parameters may correspond to respective feedback resources (e.g., according to a configuration for a set of open loop power control parameters), or to respective physical resource indicators (e.g., as signaled in downlink control information).

30 Claims, 19 Drawing Sheets

(51) Int. Cl.
    *H04W 52/24*     (2009.01)
    *H04L 5/00*     (2006.01)
    *H04W 72/12*     (2009.01)

(56) References Cited

OTHER PUBLICATIONS

International Search Report and Written Opinion—PCT/US2020/055213—ISA/EPO—dated Jan. 29, 2021 (195602WO).
LG Electronics: "Discussion on UE Feedback for DL Multicast/broadcast," 3GPP Draft, 3GPP TSG RAN WG1 Meeting #85, R1-164537 Feedback for DL Broadcast, 3RD Generation Partnership Project (3GPP), Mobile Competence Centre, 650, Route Des Lucioles, F-06921, Sophia-Antipolis Cedex, France, vol. RAN WG1, No. Nanjing, China, May 23, 2016-May 27, 2016, May 14, 2016 (May 14, 2016), XP051096398, pp. 1-5, Retrieved from the Internet: URL: http://www.3gpp.org/ftp/tsg_ran/WG1_RL1/TSGR1_85/Docs/ [retrieved on May 14, 2016] pp. 1-2.
Nortel Networks: "Cell Selection for Very Close UEs," 3GPP Draft, 3GPP TSG-RAN2 Meeting #33, R2-023000, Close UE, 3rd Generation Partnership Project (3GPP), Mobile Competence Centre, 650, Route Des Lucioles, F-06921, Sophia-Antipolis Cedex, France, vol. RAN WG2, No. Sophia Antipolis, France, Nov. 12, 2002-Nov. 15, 2002, Nov. 7, 2014 (Nov. 7, 2014), XP050886157, 3 pages, Retrieved from the Internet: URL:http://www.3gpp.org/ftp/tsg_ran/WG2_RL2/TSGR2_33/Docs/ [retrieved on Nov. 7, 2014] pp. 1-2.
SAMSUNG: "On Sidelink Power Control," 3GPP Draft, 3GPP TSG RAN WG1 #97, R1-1906950, on Sidelink Power Control, 3rd Generation Partnership Project (3GPP), Mobile Competence Centre, 650, Route Des Lucioles, F-06921, Sophia-Antipolis Cedex, France, vol. RAN WG1 No. Reno, USA, May 13, 2019-May 17, 2019, May 13, 2019 (May 13, 2019), XP051728400, 8 pages, Retrieved from the Internet: URL: http://www.3gpp.org/ftp/Meetings%5F3GPP%5FSYNC/RAN1/Docs/R1%2D1906950%2Ezip [retrieved on May 13, 2019] pp. 1-4.

\* cited by examiner

OPEN LOOP FEEDBACK POWER CONTROL FOR MULTICAST TRANSMISSIONS

CROSS REFERENCE

The present application for patent claims the benefit of U.S. Provisional Patent Application No. 62/914,869 by TAKEDA et al., entitled "OPEN LOOP FEEDBACK POWER CONTROL FOR MULTICAST TRANSMISSIONS," filed Oct. 14, 2019, assigned to the assignee hereof, and expressly incorporated by reference herein.

BACKGROUND

The following relates generally to wireless communications and more specifically to open loop feedback power control for multicast transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some cases, a single base station may communicate with multiple UEs simultaneously. For example, the base station may multicast transmissions specifically to the multiple UEs out of all UEs within a coverage area of the base station. Additionally, the base station may configure each of the multiple UEs to transmit acknowledgment feedback for the multicast transmissions to indicate whether or not each UE successfully received and decoded the multicast transmissions. Improved techniques are desired for transmitting feedback for multicast transmissions.

SUMMARY

The described techniques relate to improved methods, systems, devices, and apparatuses that support open loop feedback power control for multicast transmissions. For example, a user equipment (UE) may be configured to receive a control message scheduling a multicast transmission to the UE, and the UE may identify an open loop power control parameter for transmitting acknowledgment feedback responsive to the multicast transmission. The identification of the open loop power control parameter may be based at least in part on the transmission being multicast to a plurality of UEs, and in some cases a particular UE may identify an open loop power control parameter that is different than (e.g., less than) an open loop power control parameter associated with unicast transmissions. In various examples, open loop power control parameters may correspond to respective feedback resources (e.g., according to a configuration for a set of open loop power control parameters), or to respective physical resource indicators (e.g., as signaled in downlink control information).

By applying the described techniques for open loop feedback power control for multicast transmissions, a wireless communications system may resolve issues that arise when multiple UEs respond with acknowledgment feedback to a multicast transmission. For example, according to some acknowledgment feedback techniques, UEs may be configured to use a same resource (e.g., in the time and frequency domains) for transmitting acknowledgment feedback in response to a multicast transmission. If a same power control parameter is used for unicast feedback and multicast feedback, an accumulated power of acknowledgment feedback transmissions (e.g., from multiple UEs, as perceived at a receiver of acknowledgment feedback) responsive to multicast transmissions may be greater than a received power for acknowledgment feedback transmissions responsive to unicast transmissions. In some cases, an excessive accumulation of acknowledgment feedback power may be associated with interference that can impair decoding or demodulation of communication signaling (e.g., the acknowledgment feedback itself or signaling different than the acknowledgment feedback), or may cause excessive power consumption by acknowledgement feedback transmission, among other drawbacks. Thus, the described techniques for open loop feedback power control may improve resource utilization and efficiency in a wireless communications system when compared with acknowledgement feedback techniques that do not consider acknowledgment feedback responsive to multicast transmissions when determining open loop feedback power control parameters.

A method for wireless communication is described. The method may include receiving, at a UE, a control message scheduling a multicast transmission to the UE, determining acknowledgment feedback for the multicast transmission at the UE, identifying, based on the multicast transmission being multicast to a set of UEs, an open loop power control parameter for a feedback transmission to include the acknowledgment feedback, and transmitting the acknowledgment feedback in the feedback transmission in accordance with the open loop power control parameter.

An apparatus for wireless communication is described. The apparatus may include a processor, memory coupled with the processor, and instructions stored in the memory. The instructions may be executable by the processor to cause the apparatus to receive, at a UE, a control message scheduling a multicast transmission to the UE, determine acknowledgment feedback for the multicast transmission at the UE, identify, based on the multicast transmission being multicast to a set of UEs, an open loop power control parameter for a feedback transmission to include the acknowledgment feedback, and transmit the acknowledgment feedback in the feedback transmission in accordance with the open loop power control parameter.

Another apparatus for wireless communication is described. The apparatus may include means for receiving, at a UE, a control message scheduling a multicast transmission to the UE, means for determining acknowledgment feedback for the multicast transmission at the UE, means for identifying, based on the multicast transmission being multicast to a set of UEs, an open loop power control parameter for a feedback transmission to include the acknowledgment feedback, and means for transmitting the acknowledgment feedback in the feedback transmission in accordance with the open loop power control parameter.

A non-transitory computer-readable medium storing code for wireless communication is described. The code may include instructions executable by a processor to receive, at a UE, a control message scheduling a multicast transmission to the UE, determine acknowledgment feedback for the multicast transmission at the UE, identify, based on the multicast transmission being multicast to a set of UEs, an open loop power control parameter for a feedback transmission to include the acknowledgment feedback, and transmit the acknowledgment feedback in the feedback transmission in accordance with the open loop power control parameter.

Some examples of the method, apparatuses, and non-transitory computer-readable medium described herein may further include operations, features, means, or instructions for determining, based on the multicast transmission being multicast, a reference signal for path loss estimation, and transmitting the feedback transmission may be based on the open loop power control parameter and the reference signal for path loss estimation.

In some examples of the method, apparatuses, and non-transitory computer-readable medium described herein, identifying the open loop power control parameter may include operations, features, means, or instructions for determining the open loop power control parameter based on the feedback transmission including feedback for only multicast transmissions.

In some examples of the method, apparatuses, and non-transitory computer-readable medium described herein, the open loop power control parameter determined based on the feedback transmission including feedback for only multicast transmissions may be different than a unicast open loop power control parameter.

In some examples of the method, apparatuses, and non-transitory computer-readable medium described herein, identifying the open loop power control parameter may include operations, features, means, or instructions for determining the open loop power control parameter based on the feedback transmission including feedback for a multicast transmissions and a unicast transmission.

In some examples of the method, apparatuses, and non-transitory computer-readable medium described herein, the control message may be received in a downlink control channel, and the method, apparatuses, or non-transitory computer-readable medium may further include operations, features, means, or instructions for determining that the multicast transmission is multicast based on a radio network temporary identifier associated with the downlink control channel.

In some examples of the method, apparatuses, and non-transitory computer-readable medium described herein, identifying the open loop power control parameter and transmitting the acknowledgment feedback in the feedback transmission may be based on the acknowledgment feedback being a negative acknowledgement.

In some examples of the method, apparatuses, and non-transitory computer-readable medium described herein, identifying the open loop power control parameter may include operations, features, means, or instructions for identifying a feedback resource for the feedback transmission based on the multicast transmission being multicast, and determining the open loop power control parameter based on the feedback resource.

In some examples of the method, apparatuses, and non-transitory computer-readable medium described herein, identifying the open loop power control parameter may include operations, features, means, or instructions for receiving a physical resource indicator identifying a feedback resource for the feedback transmission, and determining the open loop power control parameter based on the physical resource indicator.

Some examples of the method, apparatuses, and non-transitory computer-readable medium described herein may further include operations, features, means, or instructions for determining a reference signal for path loss estimation based on the physical resource indicator, and transmitting the feedback transmission may be based on the open loop power control parameter and the reference signal for path loss estimation.

A method for wireless communication is described. The method may include identifying a multicast transmission for a plurality of UEs, determining, based on a quantity of the plurality of UEs, an open loop power control parameter for feedback transmissions responsive to multicast transmissions, and transmitting, to the UEs, the multicast transmission and an indication of the open loop power control parameter.

An apparatus for wireless communication is described. The apparatus may include a processor, memory coupled with the processor, and instructions stored in the memory. The instructions may be executable by the processor to cause the apparatus to identify a multicast transmission for a plurality of UEs, determine, based on a quantity of the plurality of UEs, an open loop power control parameter for feedback transmissions responsive to multicast transmissions, and transmit, to the UEs, the multicast transmission and an indication of the open loop power control parameter.

Another apparatus for wireless communication is described. The apparatus may include means for identifying a multicast transmission for a plurality of UEs, means for determining, based on a quantity of the plurality of UEs, an open loop power control parameter for feedback transmissions responsive to multicast transmissions, and means for transmitting, to the UEs, the multicast transmission and an indication of the open loop power control parameter.

A non-transitory computer-readable medium storing code for wireless communication is described. The code may include instructions executable by a processor to identify a multicast transmission for a plurality of UEs, determine, based on a quantity of the plurality of UEs, an open loop power control parameter for feedback transmissions responsive to multicast transmissions, and transmit, to the UEs, the multicast transmission and an indication of the open loop power control parameter.

In some examples of the method, apparatuses, and non-transitory computer-readable medium described herein, the plurality of UEs may include a first set of UEs and a second set of UEs, and the determining may include operations, features, means, or instructions for determining a first open loop power control parameter for the first set of UEs based on a quantity of the first set of UEs, and determining a second open loop power control parameter for the second set of UEs based on a quantity of the second set of UEs.

Some examples of the method, apparatuses, and non-transitory computer-readable medium described herein may further include operations, features, means, or instructions for identifying a configuration for a set of open loop power control parameters each corresponding to a respective feedback resource, and transmitting the indication of the open loop power control parameter includes transmitting an indication of the respective feedback resource corresponding to the open loop power control parameter.

Some examples of the method, apparatuses, and non-transitory computer-readable medium described herein may further include operations, features, means, or instructions for identifying a configuration for a set of open loop power control parameters each corresponding to a respective physical resource indicator, and transmitting the indication of the open loop power control parameter may include transmitting, in downlink control information corresponding to the multicast transmission, an indication of the respective physical resource indicator corresponding to the open loop power control parameter.

In some examples of the method, apparatuses, and non-transitory computer-readable medium described herein, the open loop power control parameter may be associated with feedback transmissions responsive to only multicast transmissions.

In some examples of the method, apparatuses, and non-transitory computer-readable medium described herein, the open loop power control parameter for feedback transmissions responsive to multicast transmissions may be different than a unicast open loop power control parameter.

In some examples of the method, apparatuses, and non-transitory computer-readable medium described herein, the open loop power control parameter may be associated with feedback transmissions responsive to a multicast transmission and a unicast transmission.

In some examples of the method, apparatuses, and non-transitory computer-readable medium described herein, the open loop power control parameter may be associated with negative acknowledgment feedback.

DETAILED DESCRIPTION

Figure 1:
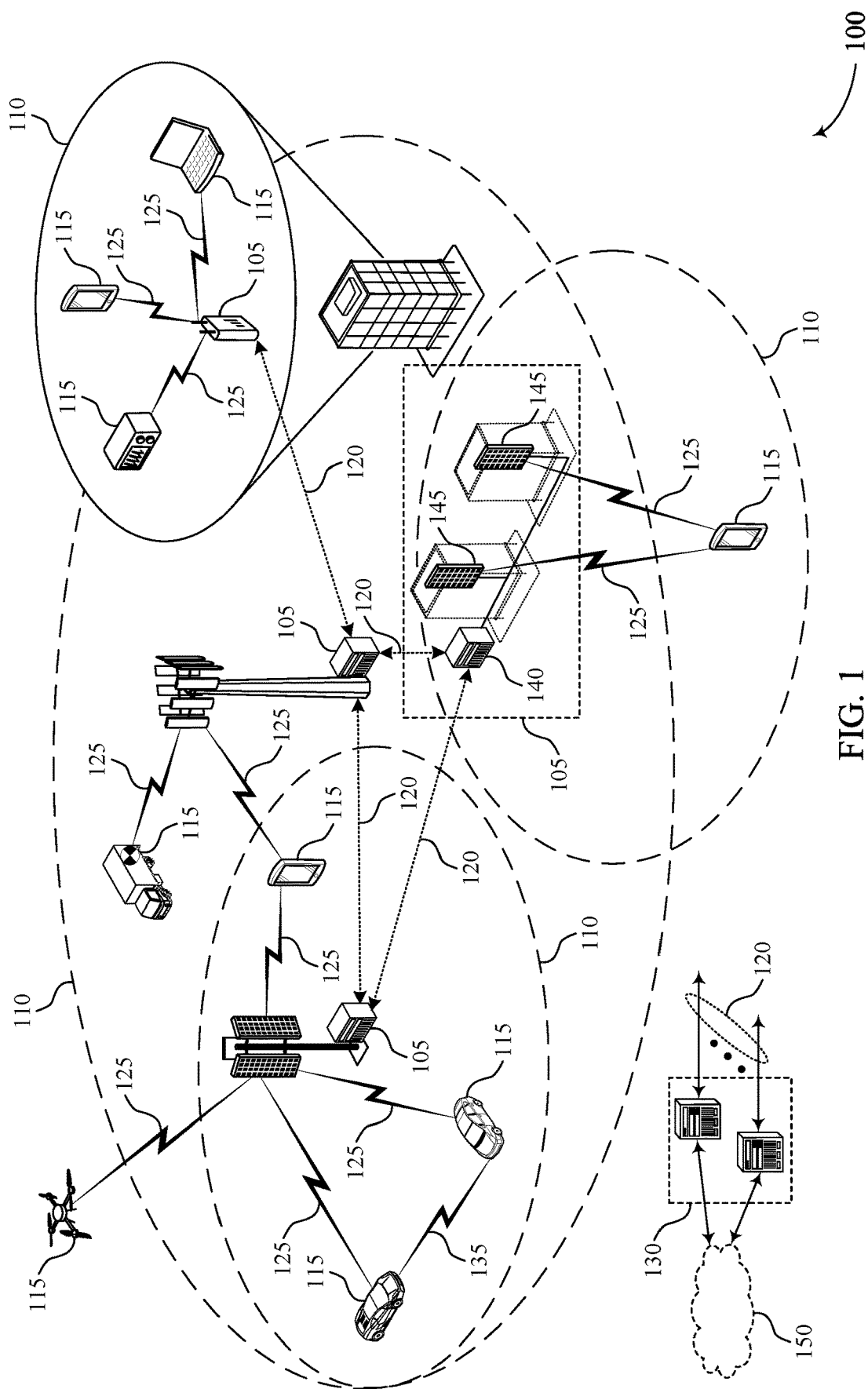
FIG. 1 illustrates an example of a wireless communications system that supports open loop feedback power control for multicast transmissions in accordance with aspects of the present disclosure.

The described techniques relate to improved methods, systems, devices, and apparatuses that support open loop feedback power control for multicast transmissions. For example, a user equipment (UE) may be configured to receive a control message scheduling a multicast transmission to the UE, and the UE may identify an open loop power control parameter for transmitting acknowledgment feedback responsive to the multicast transmission. The identification of the open loop power control parameter may be based at least in part on the transmission being multicast to a plurality of UEs, and in some cases a particular UE may identify an open loop power control parameter that is different than (e.g., less than) an open loop power control parameter associated with unicast transmissions. In various examples, open loop power control parameters may correspond to respective feedback resources (e.g., according to a configuration for a set of open loop power control parameters), or to respective physical resource indicators (e.g., as signaled in downlink control information).

By applying the described techniques for open loop feedback power control for multicast transmissions, a wireless communications system may resolve issues that arise when multiple UEs respond with acknowledgment feedback to a multicast transmission. For example, according to some acknowledgment feedback techniques, UEs may be configured to use a same resource (e.g., in the time and frequency domains) for transmitting acknowledgment feedback in response to a multicast transmission. If a same power control parameter is used for unicast feedback and multicast feedback, an accumulated power of acknowledgment feedback transmissions (e.g., from multiple UEs, as perceived at a receiver of acknowledgment feedback) responsive to multicast transmissions may be greater than a received power for acknowledgment feedback transmissions responsive to unicast transmissions. In some cases, an excessive accumulation of acknowledgment feedback power may be associated with interference that can impair decoding or demodulation of communication signaling (e.g., the acknowledgment feedback itself or signaling different than the acknowledgment feedback), or may cause excessive power consumption by acknowledgement feedback transmission, among other drawbacks. Thus, the described techniques for open loop feedback power control may improve resource utilization and efficiency in a wireless communications system when compared with acknowledgement feedback techniques that do not consider acknowledgment feedback responsive to multicast transmissions when determining open loop feedback power control parameters.

Aspects of the disclosure are initially described in the context of wireless communications systems and open loop power control parameter configurations that may be implemented by wireless communications systems. Aspects of the disclosure are further illustrated by and described with reference to apparatus diagrams, system diagrams, and flowcharts that relate to open loop feedback power control for multicast transmissions.

FIG. 1 illustrates an example of a wireless communications system 100 that supports open loop feedback power control for multicast transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval. As used herein, the term "acknowledgement feedback" may include or otherwise refer to HARQ acknowledgement (HARQ-ACK) feedback, acknowledgement (ACK) or negative acknowledgement (NACK), ACK/NACK feedback, or other feedback responsive to a transmission intended for a receiving device.

In some examples of wireless communications system 100, a base station 105 may communicate with multiple UEs 115 simultaneously. For example, the base station 105 and UEs 115 may support a multicast service (e.g., multicast transmission, multicast data, multicast downlink), where the base station 105 transmits a message to multiple UEs 115 (e.g., via dedicated radio bearers, via radio bearers specific for multicast, via multicast radio bearers) rather than broadcasting the message to every UE 115 in a geographic coverage area 110 of the base station 105. Additionally or alternatively, the base station 105 may transmit the message to UEs 115 individually through unicast transmissions. In some cases, the base station 105 may send both multicast and unicast transmissions (e.g., based on multiplexing the transmissions in a TDM, FDM, or spatial division multiplexing (SDM) manner).

After receiving a multicast or unicast transmission from the base station 105, UEs 115 may transmit acknowledgment feedback (e.g., HARQ ACK/NACK feedback, HARQ-ACK feedback, ACK/NACK feedback) to indicate whether the multicast or unicast transmission was successfully received and decoded by the UE 115 (e.g., an ACK to indicate a successful reception and decoding, a NACK to indicate an unsuccessful reception or decoding). A UE 115 may identify a transmission power for the acknowledgement feedback according to various techniques, which may include determining a closed loop power control parameter, an open loop power control parameter, or both. According to various examples disclosed herein, power control parameters for a feedback transmission may be based at least in part on such a feedback transmission including acknowledgment feedback for a transmission that is multicast to a plurality of UEs 115.

Figure 2:
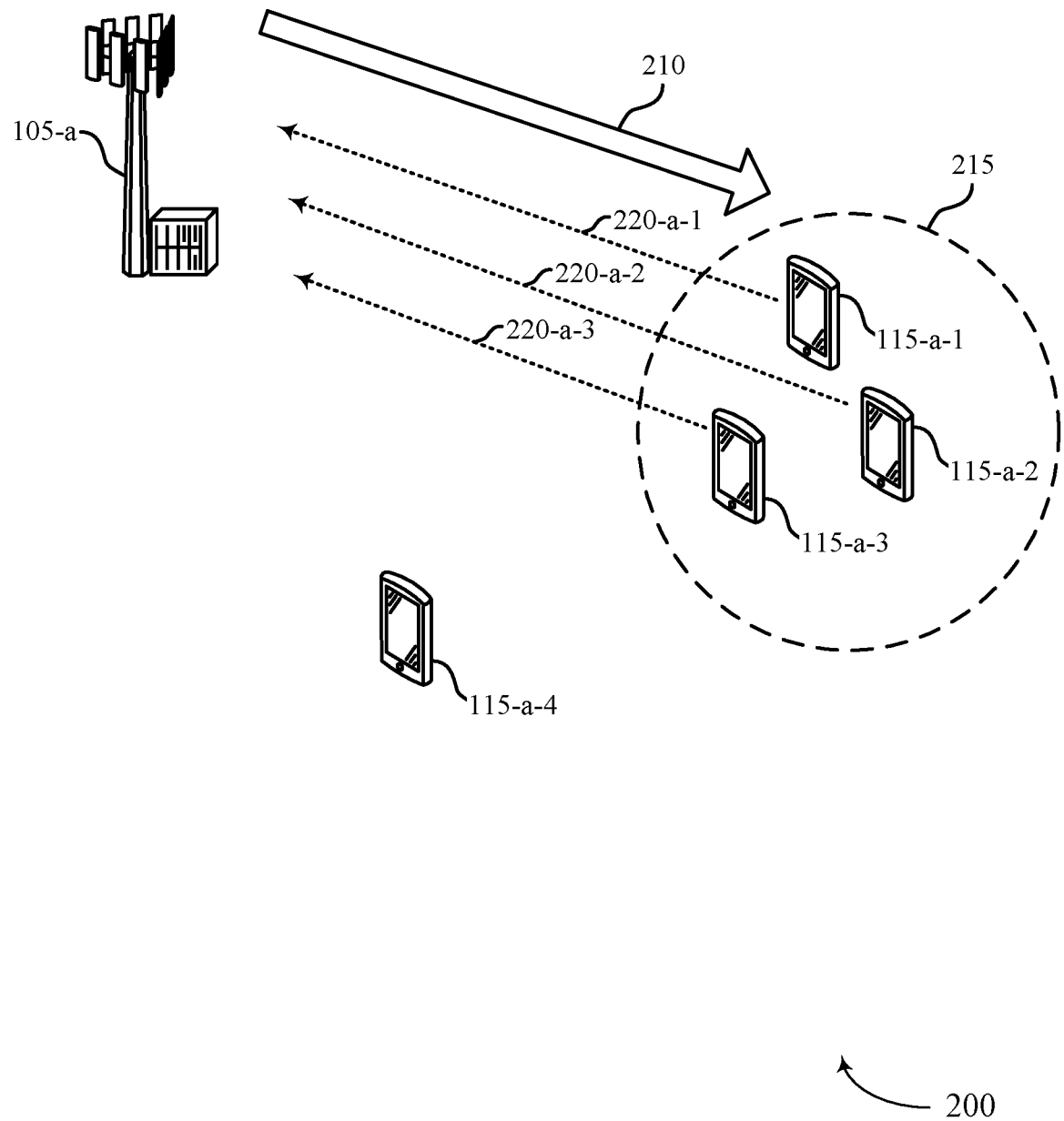
FIG. 2 illustrates an example of a wireless communications system that supports open loop feedback power control for multicast transmissions in accordance with aspects of the present disclosure.

FIG. 2 illustrates an example of a wireless communications system 200 that supports open loop feedback power control for multicast transmissions in accordance with aspects of the present disclosure. In some examples, the wireless communications system 200 may implement aspects of a wireless communications system 100 described with reference to FIG. 1. The wireless communications system 200 may include a base station 105-*a*, and multiple UEs 115-*a* (e.g., UEs 115-*a*-1, 115-*a*-2, 115-*a*-3, and 115-*a*-4), which may be examples of base stations 105 and UEs 115, respectively, as described with reference to FIG. 1.

In some examples of the wireless communications system 200, the base station 105-*a* may communicate with multiple UEs 115-*a* simultaneously. For example, the base station 105-*a* and the UEs 115-*a* may support a multicast service, where the UEs 115-*a*-1, 115-*a*-2, and 115-*a*-3 may be grouped for transmission scheduling in a multicast group 215. To support multicast transmissions, the base station 105-*a* may schedule each of the UEs 115-*a*-1, 115-*a*-2, and 115-*a*-3 in the multicast group 215 for one or more multicast transmissions (e.g., multicast transmission 210), which may include a scheduling by way of a multicast downlink grant or multicast downlink assignment from the base station 105-*a* that may be conveyed via a control message such as downlink control information (DCI) of a physical downlink control channel (PDCCH) or other control signaling.

The multicast transmission 210 may be an alternative to broadcasting a data transmission to all UEs 115 in a geographic coverage area of base station 105-*a*, or separately transmitting unicast data transmissions to each of the UEs 115-*a* (e.g., of the multicast group 215). UEs 115-*a* that are not part of the multicast group 215 (e.g., UE 115-*a*-4) may be served by the base station 105-*a*, but may not be scheduled for the multicast transmissions of the multicast group 215. For example, the UE 115-*a*-4 may be scheduled for different communications with the base station 105-*a*, such as unicast transmissions, broadcast transmissions, or multicast transmissions associated with a group that is different than the multicast group 215. Additionally or alternatively, the base station 105-*a* may schedule unicast transmissions to any one or more of the UEs 115-*a* (e.g., via one or more unicast grants), or schedule broadcast transmissions to all of the UEs 115-*a* in the coverage area of the base station 105-*a* (e.g., via a broadcast grant). In some examples, a device of the wireless communications system 200 (e.g., the base station 105-*a*) may be configured to support a dynamic selection of whether to transmit a particular data message (e.g., a MAC protocol data unit (PDU)) as a multicast transmission, as a unicast transmission, or as a broadcast transmission.

The UEs 115-*a* may be configured for various types of acknowledgment feedback responsive to the multicast transmission 210. For example, each of the UEs 115-*a* may be configured to transmit a respective feedback transmission 220-*a*, or refrain from transmitting a respective feedback transmission 220-*a*, under various circumstances. The feedback transmissions 220-*a* may include acknowledgment feedback for one or more transmissions that may include the multicast transmission 210, and may be conveyed in an uplink control message (e.g., via a physical uplink control channel (PUCCH), via uplink control information). The feedback transmissions 220-*a* may be transmitted on uplink resources (e.g., in the time and frequency domains) that are identified by the respective UE 115-*a* based various factors or combinations of factors, such as a configuration or signaling by the base station 105-*a* (e.g., an RRC configuration), a preconfiguration of the base station 105-*a* and UEs 115-*a* (e.g., a configuration or lookup resource known by both the base station 105-*a* and the UEs 115-*a*), a type of one or more transmissions being responded to by a respective UE 115-*a* (e.g., whether or not the transmission was multicast to a multiple UEs 115-*a*, such as a multicast group 215), whether or not a particular transmission was successfully received or decoded, or others.

In one example of a configuration for acknowledgment feedback, a UE 115-*a* may use a UE-dedicated ACK/NACK feedback configuration, where the UE 115-*a* scheduled to receive the multicast transmission 210 (e.g., a multicast data transmission) sends an ACK or a NACK using a resource (e.g., a feedback resource, a resource in the time domain and frequency domain, a time-frequency resource) configured or indicated by base station 105-a or another network device. In some examples, a configured or indicated resource for transmitting the respective feedback transmission 220-a may be dedicated solely for a particular UE 115-a, and may be transparent to other UEs 115-a of the multicast group 215 that are scheduled to receive the multicast transmission 210 (e.g., UE-transparent).

Additionally or alternatively, UEs 115-a of the multicast group 215 may use a UE-shared NACK feedback configuration, where a UE 115-a scheduled to receive the multicast transmission 210 sends a NACK using a resource configured or indicated by base station 105-a when a reception or decoding error is identified. However, in some examples of the UE-shared NACK configuration, a respective UE 115-a may not transmit a feedback transmission 220-a otherwise. For example, a respective UE 115-a may refrain from transmitting a feedback transmission 220-a if the multicast transmission 210 is successfully received and decoded (e.g., refrain from sending an ACK). In the UE-shared NACK feedback configuration, a feedback resource may be shared by multiple UEs 115-a that are scheduled to receive the multicast transmission 210, which may also be transparent to other UEs 115-a. In such examples where a feedback resource is shared among UEs 115-a, the base station 105-a may not know which UE 115-a transmitted a NACK and, as such, may retransmit data carried initially in the multicast transmission 210 (e.g., via a multicast retransmission, via one or more unicast transmissions) to all of the UEs 115-a of the multicast group 215 that were scheduled for the original multicast transmission 210. In some cases, the base station 105-a may assign or divide the UEs 115-a of the multicast group 215 into smaller sub-groups of UEs 115-a (e.g., subsets of UEs 115-a), such that if a NACK is received, base station 105-a may identify one of the smaller groups from which the NACK is received and retransmit the message to a smaller group rather than all of the UEs 115-a of the multicast group 215.

The UEs 115-a may implement various techniques for determining a transmission power for transmitting the feedback transmissions 220-a, which may be based on a type of transmission that is being responded to (e.g., whether the respective feedback transmission includes acknowledgment feedback responsive to a unicast transmission, a multicast transmission, a broadcast transmission, or a combination thereof). In one example, a transmit power, $P_{PUCCH}$, for a feedback transmission 220-a may be determined for a PUCCH on an active uplink bandwidth part (BWP) b of a carrier f of a primary cell c (e.g., of the base station 105-a), which may be based on a power control adjustment state l, in accordance with the following:

$$P_{PUCCH,b,f,c}(i, q_u, q_d, l) = \min \left\{ \begin{array}{l} P_{CMAX,f,c}(i), \\ P_{O\_PUCCH,b,f,c}(q_u) + 10\log_{10}(2^\mu \cdot M_{RB,b,f,c}^{PUCCH}(i)) + \\ PL_{b,f,c}(q_d) + \Delta_{F\_PUCCH}(F) + \Delta_{TF,b,f,c}(i) + g_{b,f,c}(i, l) \end{array} \right\} \quad (1)$$

where:

$P_{CMAX,f,c}(i)$ may refer to a UE-configured maximum output power for the carrier f of the primary cell c in a PUCCH transmission occasion i $P_{O\_PUCCH,b,f,c}(q_u)$ may refer to an open loop power control parameter associated with an index $q_u$ for a set of open loop power control parameters for the active uplink BWP b of the carrier f of the primary cell c $M_{RB,b,f,c}^{PUCCH}(i)$ may refer to a bandwidth of a PUCCH resource assignment expressed in number of resource blocks for the PUCCH transmission occasion i on the active uplink BWP b of the carrier f of the primary cell c $PL_{b,f,c}(q_d)$ may refer to a downlink pathloss estimate calculated by a UE using a reference signal resource index $q_d$ for an active downlink BWP b of the carrier f of the primary cell c (e.g., using a reference signal for path loss estimation)

$\Delta_{F\_PUCCH}(F)$ may refer to an offset value, if provided, or may be omitted (e.g., where $\Delta_{F\_PUCCH}(F)=0$)

$\Delta_{TF,b,f,c}(i)$ may refer to a PUCCH transmission power adjustment component on the active uplink BWP b of the carrier f of the primary cell c $g_{b,f,c}(i, l)$ may refer to a current PUCCH power control adjustment state l for the active uplink BWP b of the carrier f of the serving cell c and PUCCH transmission occasion i Although Equation (1) illustrates one example for determining a transmission power for a feedback transmission 220, other techniques or relationships may be used for determining a transmission power for feedback transmissions 220. More generally, a UE 115-a may determine a transmission power (e.g., $P_{PUCCH}$) for a feedback transmission 220 based at least in part on an open loop power control parameter (e.g., $P_{O\_PUCCH}$), and transmit acknowledgment feedback in a feedback transmission 220 in accordance with (e.g., based at least in part on) the open loop power control parameter.

In some examples, a transmission power for a feedback transmission 220 that is responsive to a multicast transmission (e.g., multicast transmission 210) may be calculated in a same or similar manner as a transmission power for a feedback transmission that is responsive to a unicast transmission. However, using a same or similar transmission power calculation for multicast transmissions and unicast transmissions may have drawbacks.

In a first example, a node of the wireless communications system 200 that transmits the multicast transmission 210 may be different than a node of the wireless communications system 200 that receives the feedback transmissions 220-a. For example, the multicast transmission 210 may be transmitted by a first access network transmission entity 145 (e.g., a first TRP) and the feedback transmissions 220-a may be received by a second access network transmission entity 145 (e.g., a second TRP), which may or may not share a common access network entity 140. In another example, the multicast transmission 210 may be transmitted by the base station 105-a (e.g., a first base station) and the feedback transmissions 220-a may be received by another base station 105 (e.g., a second base station, not shown). In yet another example, the multicast transmission 210 may be associated with a transmission of a first cell of the base station 105-a, and the feedback transmissions 220-a may be associated with a reception of a second cell of the base station 105-a. In these and other examples, an open loop power control parameter for feedback responsive to a multicast transmission, or a reference signal used for associated path loss estimation, may not be the same as those used for an uplink transmission (e.g., via a physical uplink shared channel (PUSCH)) carrying feedback responsive to a unicast transmission. From the perspective of the UEs 115-a, different access network transmission entities (e.g., TRPs or base stations 105) may be identified as different sources providing different quasi-co-location (QCL) properties. More specifically, a UE 115-*a* may be configured by the network or may itself identify that two reference signals have different QCL properties, which may indicate that the two reference signals may have been transmitted by different TRPs or base stations.

In another example, for UE-shared NACK, a quantity of UEs 115-*a* sharing a same feedback resource may not be even across uplink resources (e.g., PUCCH resources), and an appropriate open loop power control parameter may be different depending on a quantity of UEs 115-*a* sharing the resource. For example, an appropriate open loop power control parameter corresponding to an uplink feedback resource may be dependent on a quantity of UEs 115-*a* sharing the uplink feedback resource. Such an approach may be beneficial for communications that use code-division multiplexing, code-division multiple access, or other multiplexing in the code domain or spatial domain, because different powers of one resource may interfere with reception of another resource (e.g., at a receiving device). Thus, when a relatively higher quantity of UEs 115-*a* may be sharing a feedback resource, it may be beneficial to implement a relatively lower open loop power control parameter, and when a relatively lower quantity of UEs 115-*a* may be sharing a feedback resource, it may be beneficial to implement a relatively higher open loop power control parameter. By applying various supporting techniques at the base station 105-*a* and the UEs 115-*a*, the wireless communications system 200 may improve resource utilization and efficiency in comparison acknowledgement feedback techniques that do not consider acknowledgment feedback responsive to multicast transmissions when determining open loop feedback power control parameters.

In one example of a feedback configuration that supports the described techniques for open loop feedback power control, the wireless communications system 200 may implement separate configurations of open loop power control parameters for feedback transmissions (e.g., via PUCCH) carrying acknowledgment feedback responsive to unicast transmissions, acknowledgment feedback responsive to multicast transmissions, or acknowledgment feedback responsive to a combination of unicast transmissions and multicast transmissions. Additionally or alternatively, the wireless communications system 200 may implement separate configurations of reference signals for path loss estimation for feedback transmissions (e.g., via PUCCH) carrying acknowledgment feedback responsive to unicast transmissions, acknowledgment feedback responsive to multicast transmissions, or acknowledgment feedback responsive to a combination of unicast transmissions and multicast transmissions.

For example, the UEs 115-*a* may be configured with more than one set of $\{P_O, RS\}$ for feedback transmissions 220-*a* (e.g., via PUCCH), where $P_O$ may generally refer to an open loop power control parameter and RS may generally refer to a reference signal for path loss estimation that corresponds to or is otherwise associated with the open loop power control parameter. For a feedback transmission 220-*a* carrying acknowledgment feedback responsive to one or more multicast transmissions (e.g., only multicast transmissions, such as multicast transmission 210, and not unicast transmissions), a first set of $\{P_O, RS\}$ may be used. For a feedback transmission 220-*a* carrying acknowledgment feedback responsive to one or more unicast transmissions (e.g., only unicast transmissions, and not multicast transmissions), a second set of $\{P_O, RS\}$ may be used. For a feedback transmission 220-*a* carrying acknowledgment feedback responsive to both a multicast transmission and a unicast transmission, a third set of $\{P_O, RS\}$ may be used, which may be the same as, or otherwise share values of, the set of $\{P_O, RS\}$ corresponding to acknowledgment feedback responsive to unicast transmissions (e.g., the second set of $\{P_O, RS\}$).

Thus, in accordance with examples as disclosed herein, an open loop power control parameter for a feedback transmission 220-*a* may be identified based at least in part on whether or not a transmission is multicast to a set of UEs 115-*a* (e.g., of a multicast group 215), and a feedback transmission 220-*a* may be transmitted, by a UE 115-*a* scheduled to receive the transmission, in accordance with the open loop power control parameter (e.g., according to a transmission power that is based at least in part on the identified open loop power control parameter). In some examples, a transmission power, $P_{PUCCH}$, may be determined for a corresponding PUCCH based on a relationship such as Equation (1) above, using an open loop power control parameter, $P_{O,PUCCH}$, that is determined based at least in part on whether a transmission is multicast. In some examples, for a feedback transmission 220-*a* via a PUSCH that is carrying acknowledgment feedback responsive to either or both of multicast and unicast transmissions (e.g., a PUSCH feedback transmission), a transmission power control equation for the uplink transmission for PUSCH (e.g., including open loop power control parameters for PUSCH and a reference signal for path loss estimation) may be applied.

In some examples, the UEs 115-*a* may be configured to identify whether a scheduled or received transmission is multicast or unicast based at least in part on an radio network temporary identifier (RNTI) associated with a particular transmission (e.g., an RNTI that a received physical downlink shared channel (PDSCH) transmission is associated with). For example, when a UE 115-*a* identifies some types or categories of RNTI, such as a cell RNTI (C-RNTI), or a modulation and coding scheme cell RNTI (MCS-C-RNTI), or a configured scheduling RNTI (CS-RNTI), the UE 115-*a* may determine that the scheduled or received transmission was unicast. When a UE 115-*a* identifies other types or categories of RNTI, such as a GSM EDGE Radio Access Network (GERAN) RNTI (G-RNTI), the UE 115-*a* may determine that the scheduled or received transmission was multicast.

In some examples, the UEs 115-*a* may be configured for identifying or determining open loop power control parameters based on various configurations by a base station 105-*a*, such as an RRC configuration of RRC signaling exchanged as part of connection establishment between the base station 105-*a* and a respective UE 115-*a*. In some examples, such a configuration may be applied to feedback transmissions 220-*a* without additional signaling (e.g., without signaling that accompanies a multicast transmission 210). Additionally or alternatively, the UEs 115-*a* may be configured for identifying or determining open loop power control parameters based on control signaling by a base station 105-*a* (e.g., DCI of a PUCCH, which may be a DCI that includes a grant or other scheduling of a transmission), which may accompany or otherwise be part of a multicast transmission 210.

Figure 3:
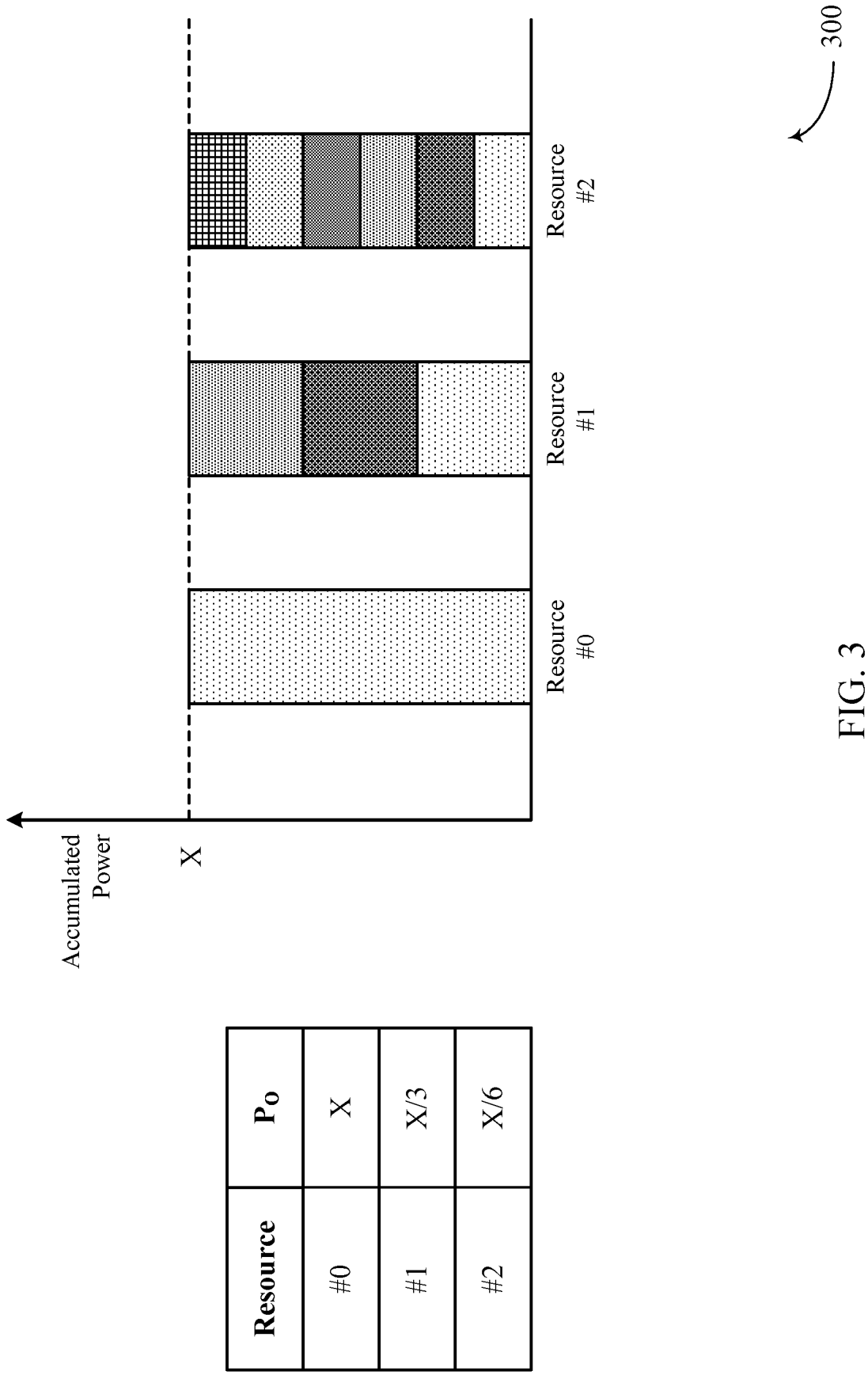
FIG. 3 illustrates an example of an open loop power control parameter configuration that supports open loop feedback power control for multicast transmissions in accordance with aspects of the present disclosure.

FIG. 3 illustrates an example of an open loop power control parameter configuration 300 that supports open loop feedback power control for multicast transmissions in accordance with aspects of the present disclosure. In some examples, the open loop power control parameter configuration 300 may be implemented by a wireless communications system 100 or a wireless communications system 200 described with reference to FIG. 1 or 2. For example, the open loop power control parameter configuration 300 may be combined with or otherwise applied in accordance with various techniques described with reference to the wireless communications system 200 of FIG. 2.

The open loop power control parameter configuration 300 illustrates an example of supporting separate open loop power control parameters across a set of feedback resources (e.g., PUCCH resources) for feedback transmissions that may be carrying acknowledgment feedback responsive to multicast transmissions. For example, Resource #0 may be associated with an open loop power control parameter, $P_O$, equal to X, Resource #1 may be associated with an open loop power control parameter, $P_O$, equal to X/3, and Resource #2 may be associated with an open loop power control parameter, $P_O$, equal to X/6. In some examples, each of the feedback resources may additionally be associated with a respective reference signal for path lost estimation, which may be used by a UE 115 for determining a transmission power for a feedback transmission.

In one example, X may be associated with a nominal open loop power level, such as a nominal transmission power by a UE 115 (e.g., prior to power level adjustments for path loss or other criteria) or a power for reception at a base station 105 according to a nominal signal strength (e.g., after transmission power level determination adjustments made by a UE 115). For example, a single feedback transmission made in accordance with an open loop power control parameter equal to X may be received at a base station 105 according to a nominal signal strength, which may be beneficial to certain multiplexing techniques (e.g., according to code-division or spatial domain multiplexing techniques).

When UEs 115 are configured to share a feedback resource for acknowledgment responsive to multicast transmissions, a feedback receiver (e.g., a base station 105) may detect an accumulation of feedback transmissions (e.g., NACK transmissions) made by multiple UEs 115. For example, if two or more UEs 115 transmit NACKs according to $P_O$=X, a receiving base station 105 may receive such a feedback transmission at twice a nominal signal strength, or higher. Such an elevated signal strength on a shared feedback resource may be problematic for receiving or decoding code-division or spatially multiplexed transmissions, or may otherwise interfere with various signaling to be received by the base station 105. Accordingly, for shared feedback resources allocated to acknowledgment feedback responsive to multicast transmissions, an open loop power control parameter may be configured at a lower power (e.g., as illustrated for Resource #1 or Resource #2) when a feedback resource is shared among relatively greater quantities of UEs 115. For example, as illustrated by the open loop power control parameter configuration 300, three feedback transmissions transmitted according to the open loop power control parameter $P_O$=X/3 (e.g., of Resource #1), or six feedback transmissions transmitted according to the open loop power control parameter $P_O$=X/6 (e.g., of Resource #2), may be received or otherwise decoded by a feedback receiver in accordance with a nominal signal strength associated with the power level X In one example, the open loop power control parameter configuration 300 may be implemented for UE-shared NACK, where a quantity of UEs 115 that may transmitting NACKs on a particular resources may be different across shared resources (e.g., Resource #0, Resource #1, or Resource #2). For example, a first quantity of UEs 115 may be assigned to transmit acknowledgment feedback using Resource #0 (e.g., a first subset of a multicast group 215), and a second quantity (e.g., a greater quantity) of UEs 115 may be assigned to transmit acknowledgment feedback using Resource #1 or Resource #2. In another example, all of the UEs 115 of a multicast group 215 may be assigned to use a same feedback resource, but the assigned feedback resource may change as a quantity of UEs 115 of a multicast group 215 changes (e.g., as scheduled by a base station 105). Thus, different $P_O$ values may be configured for different feedback resources, which may support balancing an accumulation of signal power at a feedback receiver across the different feedback resources.

In some examples, a selection of a feedback resource of the open loop power control parameter configuration 300 may be made by a base station 105, which may be a selection before or after establishing a connection with one or more associated UEs 115. In other examples, a selection of one of the resources may be made by a UE 115. In either case, a UE 115 may be aware of an open loop power level associated with the respective feedback resource, and the UE 115 may identify a feedback transmission power that is associated with a respective feedback resource. In other words, depending on which resource a respective UE 115 transmits a NACK, the respective UE 115 may apply a particular $P_O$ value that is associated with the resource, thereby supporting a wireless communications system aligning possible signal power or signal strength across different feedback resources.

Figure 4:
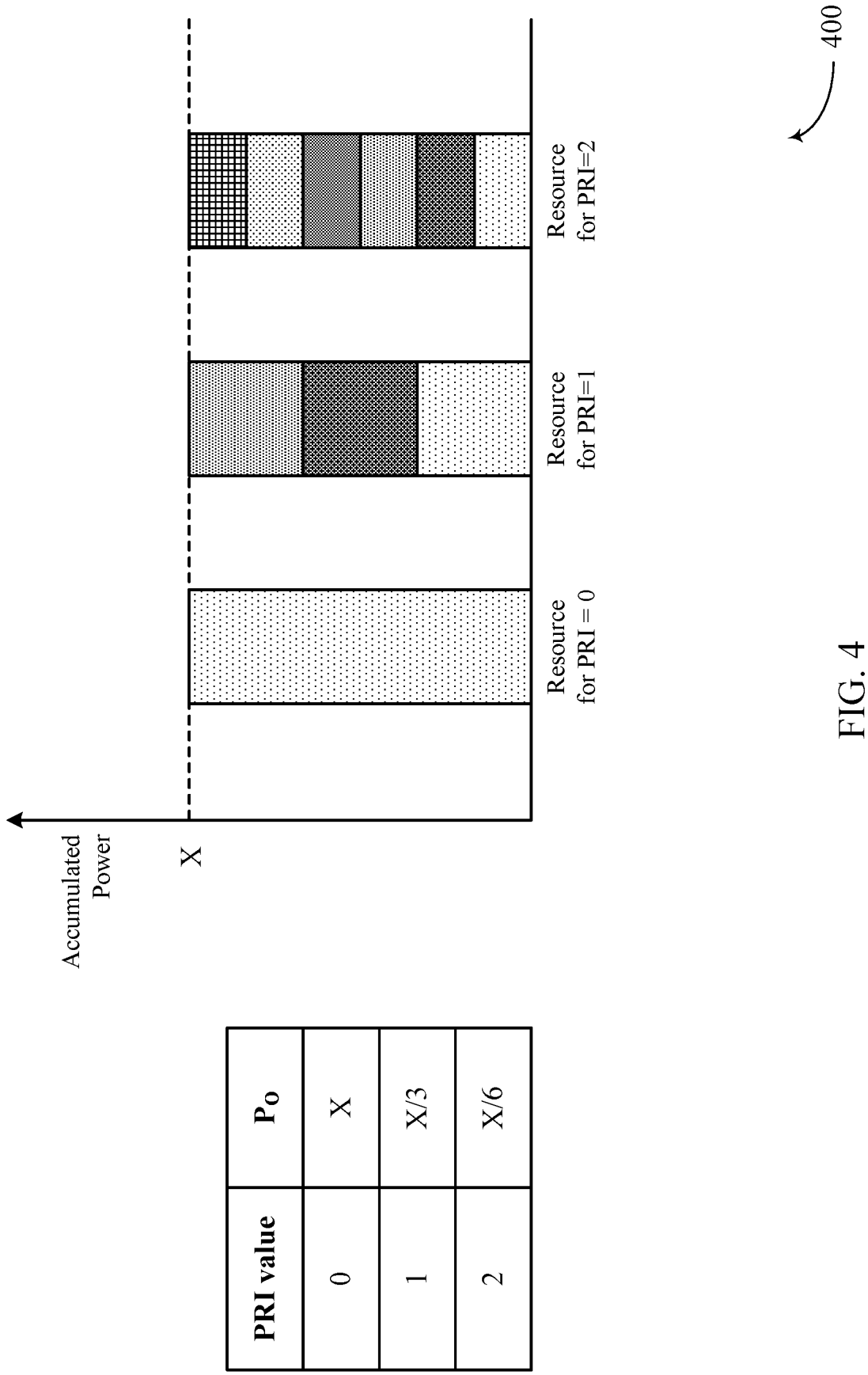
FIG. 4 illustrates an example of an open loop power control parameter configuration that supports open loop feedback power control for multicast transmissions in accordance with aspects of the present disclosure.

FIG. 4 illustrates an example of an open loop power control parameter configuration 400 that supports open loop feedback power control for multicast transmissions in accordance with aspects of the present disclosure. In some examples, the open loop power control parameter configuration 400 may be implemented by a wireless communications system 100 or a wireless communications system 200 described with reference to FIG. 1 or 2. For example, the open loop power control parameter configuration 400 may be combined with or otherwise applied in accordance with various techniques described with reference to the wireless communications system 200 of FIG. 2.

The open loop power control parameter configuration 400 illustrates an example of supporting separate open loop power control parameters across a set of PUCCH resource indicators (PRIs) for feedback transmissions that may be carrying acknowledgment feedback responsive to multicast transmissions. In some examples, the illustrated PRIs may refer to a PRI value that may be conveyed in downlink control signaling, such as DCI that may schedule a multicast transmission (e.g., a DCI that includes a multicast grant and a corresponding PRI). For example, a PRI=0 may be associated with an open loop power control parameter, $P_O$, equal to X, a PRI=1 may be associated with an open loop power control parameter, $P_O$, equal to X/3, and a PRI=2 may be associated with an open loop power control parameter, $P_O$, equal to X/6. In some examples, each of the feedback resources may additionally be associated with a respective reference signal for path lost estimation, which may be used by a UE 115 for determining a transmission power for a feedback transmission.

Like the example described with reference to the open loop power control parameter configuration 300, X may be associated with a nominal open loop power level, such as a nominal transmission power by a UE 115 (e.g., prior to power level adjustments for path loss or other criteria) or a power for reception at a base station 105 according to a nominal signal strength (e.g., after transmission power level determination adjustments made by a UE 115). For example, a single feedback transmission made in accordance with an open loop power control parameter equal to X may be received at a base station 105 according to a nominal signal strength, which may be beneficial to certain multiplexing techniques (e.g., according to code-division or spatial domain multiplexing techniques).

When UEs 115 are configured to share a feedback resource for acknowledgment responsive to multicast transmissions, a feedback receiver (e.g., a base station 105) may detect an accumulation of feedback transmissions (e.g., NACK transmissions) made by multiple UEs 115. For example, if two or more UEs 115 transmit NACKs according to $P_O=X$, a receiving base station 105 may receive such a feedback transmission at twice a nominal signal strength, or higher. Such an elevated signal strength on a shared feedback resource may be problematic for receiving or decoding code-division or spatially multiplexed transmissions, or may otherwise interfere with various signaling to be received by the base station 105. Accordingly, for shared feedback resources allocated to acknowledgment feedback responsive to multicast transmissions, an open loop power control parameter may be configured at a lower power (e.g., as illustrated for PRI=1 or PRI=2) when a feedback resource is shared among relatively greater quantities of UEs 115. For example, as illustrated by the open loop power control parameter configuration 300, three feedback transmissions transmitted according to the open loop power control parameter $P_O=X/3$ (e.g., associated with a PRI=1), or six feedback transmissions transmitted according to the open loop power control parameter $P_O=X/6$ (e.g., associated with a PRI=2), may be received or otherwise decoded by a feedback receiver in accordance with a nominal signal strength associated with the power level X In one example, the open loop power control parameter configuration 400 may be implemented for UE-shared NACK, where a quantity of UEs 115 that may transmitting NACKs on a particular resources may be different across different PRIs (e.g., PRI=0, PRI=1, or PRI=2). For example, a PRI=0 may be indicated when a first quantity of UEs 115 may be transmitting acknowledgment feedback, a PRI=1 may be indicated when a second quantity (e.g., greater than the first quantity) may be transmitting acknowledgment feedback, and a PRI=2 may be indicated when a third quantity of UEs 115 (e.g., greater than the second quantity) may be transmitting acknowledgment feedback. In examples where a PRI accompanies a scheduling of a multicast transmission, a PRI value may be shared among all of the UEs 115 in a multicast group 215. Accordingly, a base station 105 may determine to change a PRI value that accompanies multicast transmission scheduling when a quantity of UEs 115 in a multicast group 215 changes. Thus, different $P_O$ values may be configured for different feedback resources, which may support balancing an accumulation of signal power at a feedback receiver across the different feedback resources. In the example of open loop power control parameter configuration 400, such balancing may be relatively more dynamic than some examples of the open loop power control parameter configuration 300, because such indications (e.g., of an open loop power configuration parameter, or an accompanying reference signal for path loss estimation) may be configured to accompany each instance of multicast transmission scheduling.

Figure 5:
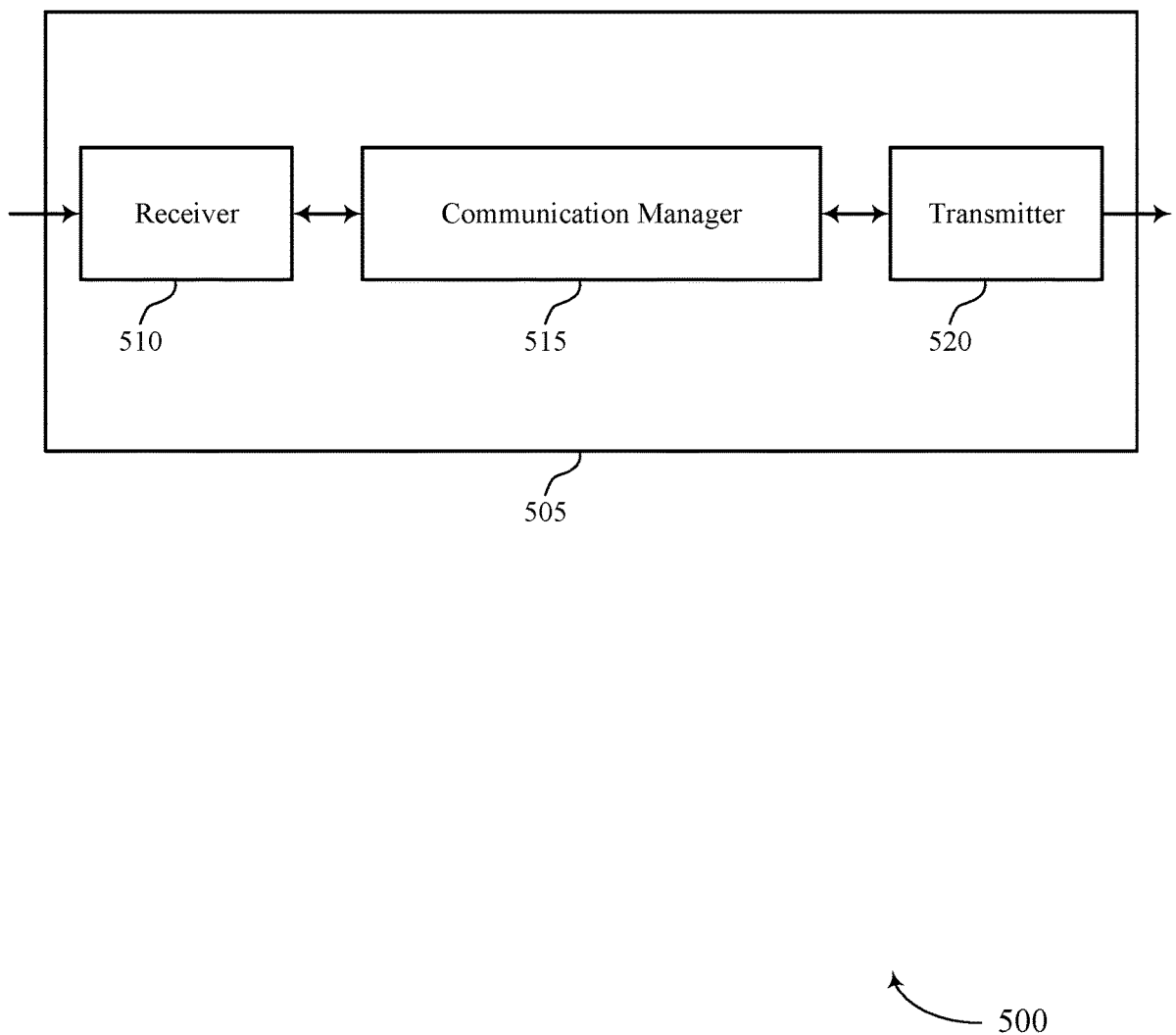
FIGS. 5 and 6 show block diagrams of devices that support open loop feedback power control for multicast transmissions in accordance with aspects of the present disclosure.

FIG. 5 shows a block diagram 500 of a device 505 that supports open loop feedback power control for multicast transmissions in accordance with aspects of the present disclosure. The device 505 may be an example of aspects of a UE 115 as described herein. The device 505 may include a receiver 510, a communication manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to open loop feedback power control for multicast transmissions, etc.). Information may be passed on to other components of the device 505. The receiver 510 may be an example of aspects of the transceiver 815 described with reference to FIG. 8. The receiver 510 may utilize a single antenna or a set of antennas.

The communication manager 515 may receive (e.g., in cooperation with the receiver 510) a control message scheduling a multicast transmission to a UE (e.g., the device 505), determine acknowledgment feedback for the multicast transmission at the UE, identify, based on the multicast transmission being multicast to a set of UEs, an open loop power control parameter for a feedback transmission to include the acknowledgment feedback, and transmit (e.g., in cooperation with the transmitter 520) the acknowledgment feedback in the feedback transmission in accordance with the open loop power control parameter. The communication manager 515 may be an example of aspects of the communication manager 810 described herein.

The communication manager 515, or its sub-components, may be implemented in hardware, code (e.g., software or firmware) executed by a processor, or any combination thereof. If implemented in code executed by a processor, the functions of the communication manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 515, or its sub-components, may be physically located at various positions, including being distributed such that portions of functions are implemented at different physical locations by one or more physical components. In some examples, the communication manager 515, or its sub-components, may be a separate and distinct component in accordance with various aspects of the present disclosure. In some examples, the communication manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 815 described with reference to FIG. 8. The transmitter 520 may utilize a single antenna or a set of antennas.

Figure 6:
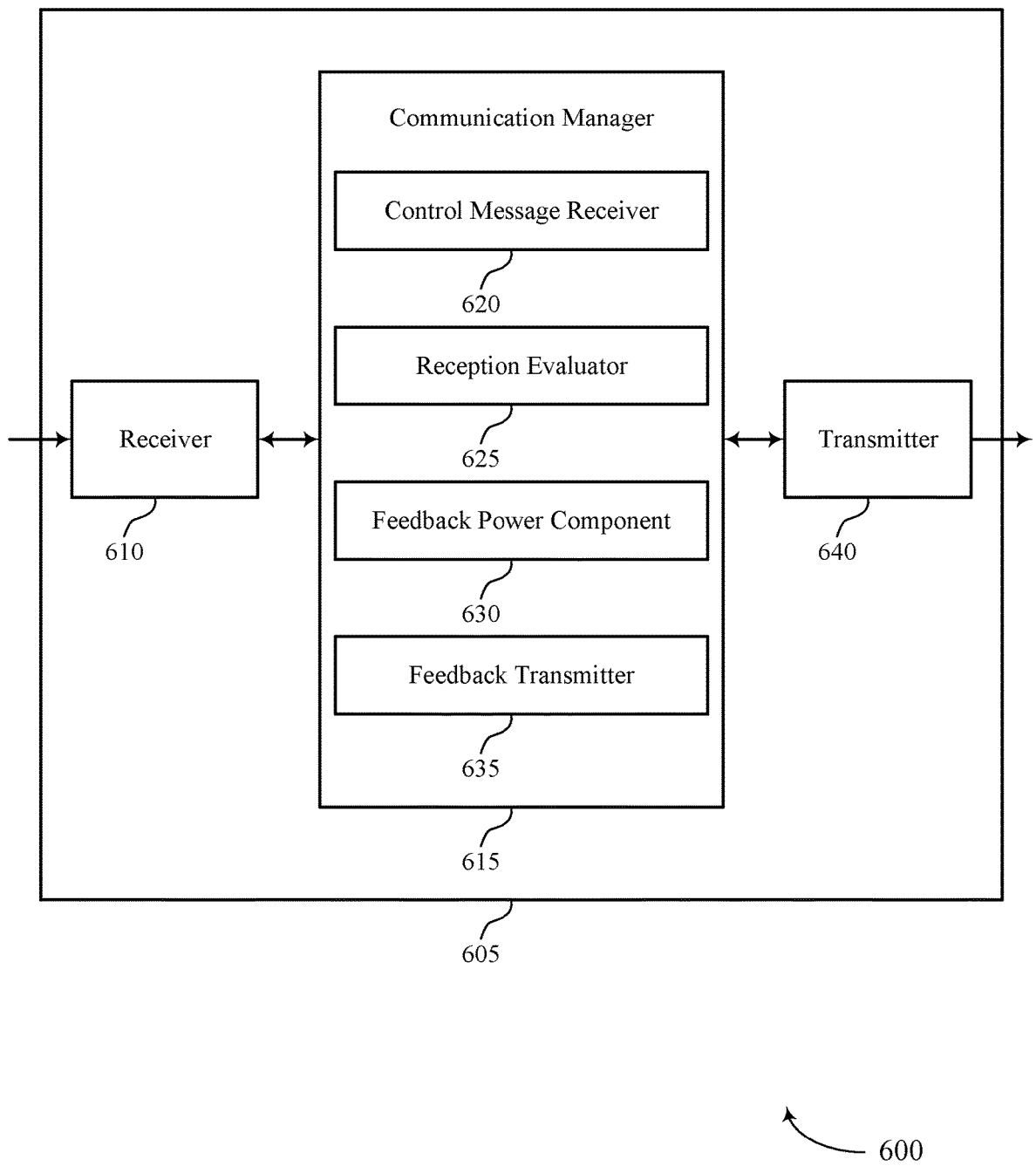

FIG. 6 shows a block diagram 600 of a device 605 that supports open loop feedback power control for multicast transmissions in accordance with aspects of the present disclosure. The device 605 may be an example of aspects of a device 505, or a UE 115 as described herein. The device 605 may include a receiver 610, a communication manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to open loop feedback power control for multicast transmissions, etc.). Information may be passed on to other components of the device 605. The receiver 610 may be an example of aspects of the transceiver 815 described with reference to FIG. 8. The receiver 610 may utilize a single antenna or a set of antennas.

The communication manager 615 may be an example of aspects of the communication manager 515 as described herein. The communication manager 615 may include a control message receiver 620, a reception evaluator 625, a feedback power component 630, and a feedback transmitter 635. The communication manager 615 may be an example of aspects of the communication manager 810 described herein.

The control message receiver 620 may receive (e.g., in cooperation with the receiver 610) a control message scheduling a multicast transmission to a UE (e.g., the device 605).

The reception evaluator 625 may determine acknowledgment feedback for the multicast transmission at the UE.

The feedback power component 630 may identify, based on the multicast transmission being multicast to a set of UEs, an open loop power control parameter for a feedback transmission to include the acknowledgment feedback.

The feedback transmitter 635 may transmit (e.g., in cooperation with the transmitter 640) the acknowledgment feedback in the feedback transmission in accordance with the open loop power control parameter.

The transmitter 640 may transmit signals generated by other components of the device 605. In some examples, the transmitter 640 may be collocated with a receiver 610 in a transceiver module. For example, the transmitter 640 may be an example of aspects of the transceiver 815 described with reference to FIG. 8. The transmitter 640 may utilize a single antenna or a set of antennas.

Figure 7:
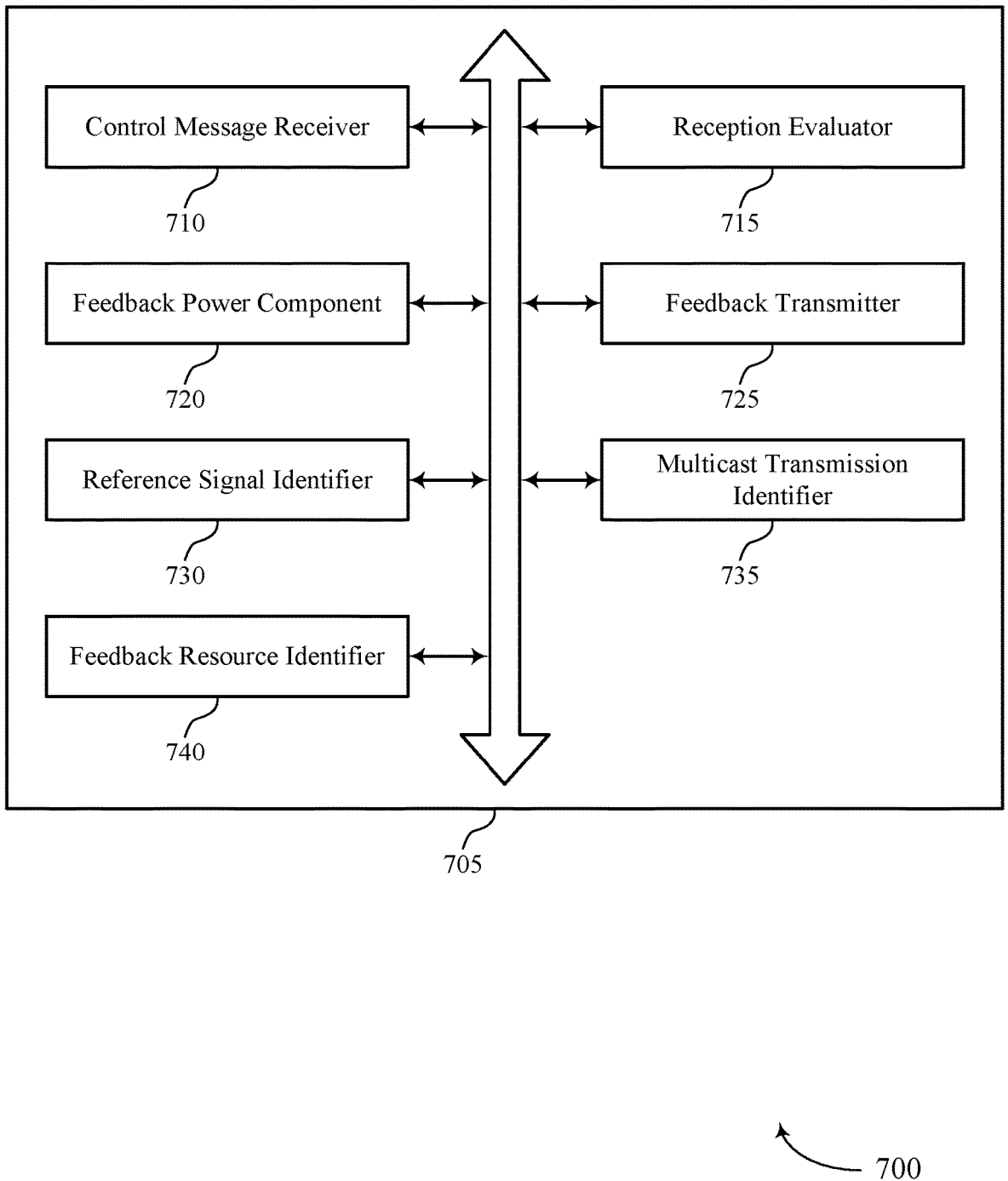
FIG. 7 shows a block diagram of a communication manager that supports open loop feedback power control for multicast transmissions in accordance with aspects of the present disclosure.

FIG. 7 shows a block diagram 700 of a communication manager 705 that supports open loop feedback power control for multicast transmissions in accordance with aspects of the present disclosure. The communication manager 705 may be an example of aspects of a communication manager 515, a communication manager 615, or a communication manager 810 described herein. The communication manager 705 may include a control message receiver 710, a reception evaluator 715, a feedback power component 720, a feedback transmitter 725, a reference signal identifier 730, a multicast transmission identifier 735, and a feedback resource identifier 740. Each of these modules may communicate, directly or indirectly, with one another (e.g., via one or more buses).

The control message receiver 710 may receive, at a UE, a control message scheduling a multicast transmission to the UE.

In some examples, the control message receiver 710 may receive a physical resource indicator identifying a feedback resource for a feedback transmission.

The reception evaluator 715 may determine acknowledgment feedback for the multicast transmission at the UE.

The feedback power component 720 may identify, based on the multicast transmission being multicast to a set of UEs, an open loop power control parameter for a feedback transmission to include the acknowledgment feedback.

In some examples, the feedback power component 720 may determine the open loop power control parameter based on the feedback transmission including feedback for only multicast transmissions. In some cases, the open loop power control parameter determined based on the feedback transmission including feedback for only multicast transmissions is different than a unicast open loop power control parameter.

In some examples, the feedback power component 720 may determine the open loop power control parameter based on the feedback transmission including feedback for a multicast transmissions and a unicast transmission.

In some examples, the feedback power component 720 may identify the open loop power control parameter based on the acknowledgment feedback being a negative acknowledgement.

In some examples, the feedback power component 720 may determine the open loop power control parameter based on a feedback resource.

In some examples, the feedback power component 720 may determine the open loop power control parameter based on a physical resource indicator.

The feedback transmitter 725 may transmit the acknowledgment feedback in the feedback transmission in accordance with the open loop power control parameter.

In some examples, the feedback transmitter 725 may transmit the feedback transmission based on the open loop power control parameter and the reference signal for path loss estimation.

In some examples, the feedback transmitter 725 may transmit the acknowledgment feedback in the feedback transmission based on the acknowledgment feedback being a negative acknowledgement.

The reference signal identifier 730 may determine, based on the multicast transmission being multicast, a reference signal for path loss estimation.

In some examples, the reference signal identifier 730 may determine a reference signal for path loss estimation based on the physical resource indicator.

The multicast transmission identifier 735 may determine that the multicast transmission is multicast based on a radio network temporary identifier associated with the downlink control channel.

The feedback resource identifier 740 may identify a feedback resource for the feedback transmission based on the multicast transmission being multicast.

Figure 8:
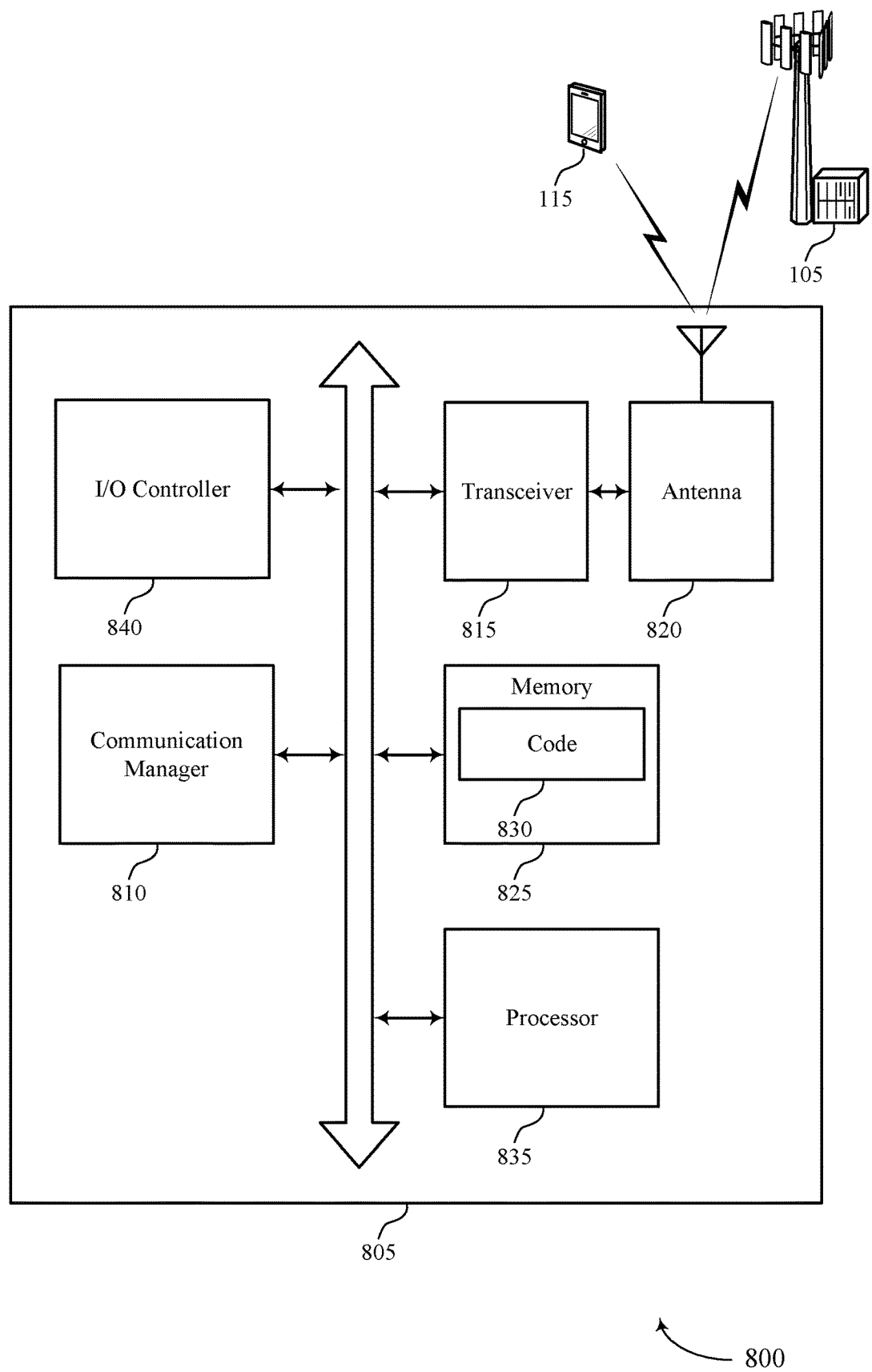
FIG. 8 shows a diagram of a system including a device that supports open loop feedback power control for multicast transmissions in accordance with aspects of the present disclosure.

FIG. 8 shows a diagram of a system 800 including a device 805 that supports open loop feedback power control for multicast transmissions in accordance with aspects of the present disclosure. The device 805 may be an example of or include the components of device 505, device 605, or a UE 115 as described herein. The device 805 may include components for bi-directional voice and data communications including components for transmitting and receiving communications, including a communication manager 810, a transceiver 815, an antenna 820, memory 825, a processor 835, and an I/O controller 840. These components may be in electronic communication via one or more buses.

The communication manager 810 may receive (e.g., in cooperation with the transceiver 815) a control message scheduling a multicast transmission to a UE (e.g., the device 805), determine acknowledgment feedback for the multicast transmission at the UE, identify, based on the multicast transmission being multicast to a set of UEs, an open loop power control parameter for a feedback transmission to include the acknowledgment feedback, and transmit (e.g., in cooperation with the transceiver 815) the acknowledgment feedback in the feedback transmission in accordance with the open loop power control parameter.

The I/O controller 840 may manage input and output signals for the device 805. The I/O controller 840 may also manage peripherals not integrated into the device 805. In some cases, the I/O controller 840 may represent a physical connection or port to an external peripheral. In some cases, the I/O controller 840 may utilize an operating system such as iOS®, ANDROID®, MS-DOS®, MS-WINDOWS®, OS/2®, UNIX®, LINUX®, or another known operating system. In other cases, the I/O controller 840 may represent or interact with a modem, a keyboard, a mouse, a touchscreen, or a similar device. In some cases, the I/O controller 840 may be implemented as part of a processor. In some cases, a user may interact with the device 805 via the I/O controller 840 or via hardware components controlled by the I/O controller 840.

The transceiver 815 may communicate bi-directionally, via one or more antennas, wired, or wireless links as described herein. For example, the transceiver 815 may represent a wireless transceiver and may communicate bi-directionally with another wireless transceiver. The transceiver 815 may also include a modem to modulate the packets and provide the modulated packets to the antennas for transmission, and to demodulate packets received from the antennas.

In some cases, the wireless device may include a single antenna 820. However, in some cases the device may have more than one antenna 820, which may be capable of concurrently transmitting or receiving multiple wireless transmissions.

The memory 825 may include RAM and ROM. The memory 825 may store computer-readable, computer-executable code 830 including instructions that, when executed, cause the processor to perform various functions described herein. In some cases, the memory 825 may contain, among other things, a basic input/output system (BIOS) which may control basic hardware or software operation such as the interaction with peripheral components or devices.

The code 830 may include instructions to implement aspects of the present disclosure, including instructions to support wireless communications. The code 830 may be stored in a non-transitory computer-readable medium such as system memory or other type of memory. In some cases, the code 830 may not be directly executable by the processor 835 but may cause a computer (e.g., when compiled and executed) to perform functions described herein.

The processor 835 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 835 may be configured to operate a memory array using a memory controller. In other cases, a memory controller may be integrated into the processor 835. The processor 835 may be configured to execute computer-readable instructions stored in a memory (e.g., the memory 825) to cause the device 805 to perform various functions (e.g., functions or tasks supporting open loop feedback power control for multicast transmissions).

Figure 9:
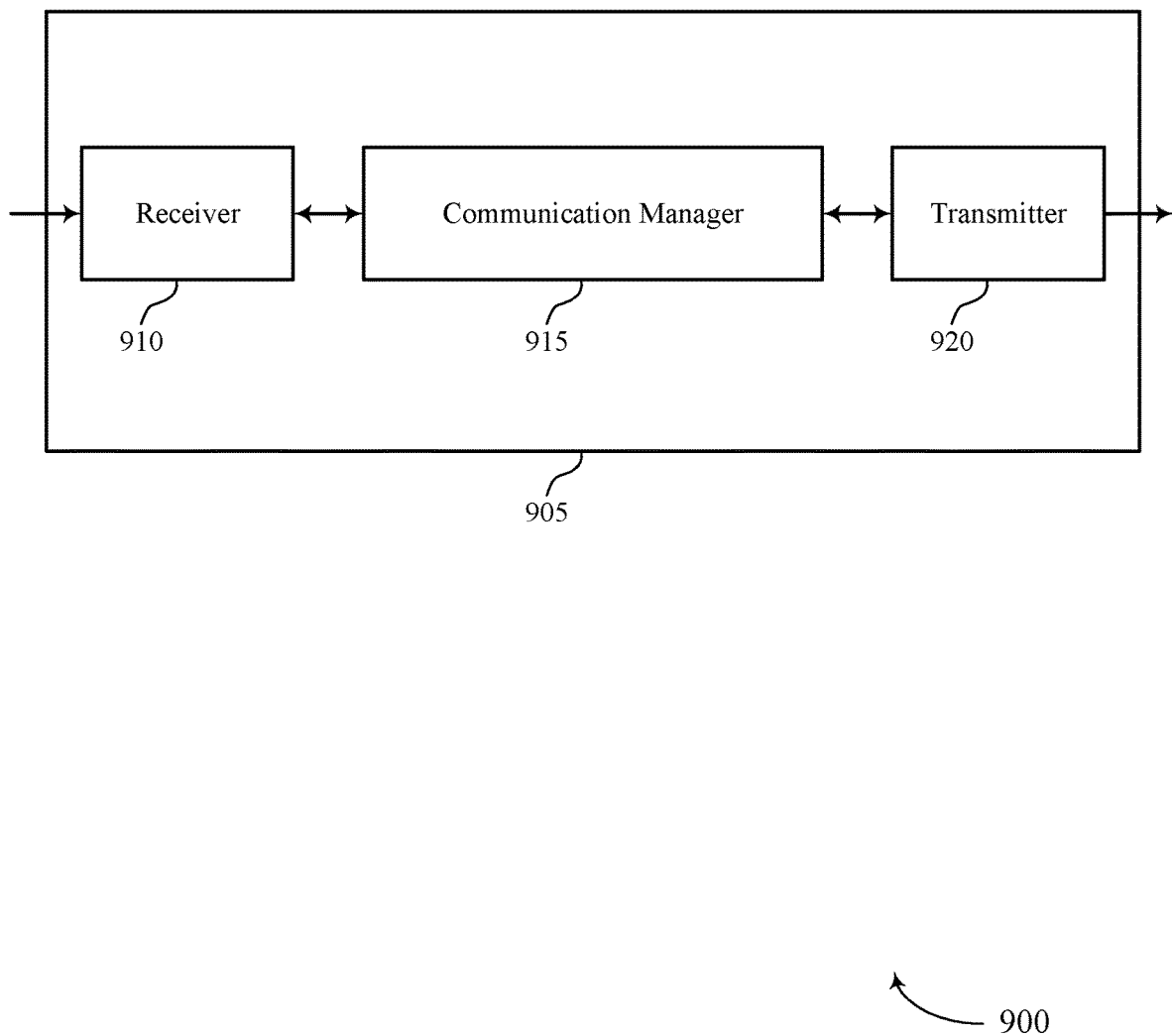
FIGS. 9 and 10 show block diagrams of devices that support open loop feedback power control for multicast transmissions in accordance with aspects of the present disclosure.

FIG. 9 shows a block diagram 900 of a device 905 that supports open loop feedback power control for multicast transmissions in accordance with aspects of the present disclosure. The device 905 may be an example of aspects of a base station 105 as described herein. The device 905 may include a receiver 910, a communication manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to open loop feedback power control for multicast transmissions, etc.). Information may be passed on to other components of the device 905. The receiver 910 may be an example of aspects of the transceiver 1220 described with reference to FIG. 12. The receiver 910 may utilize a single antenna or a set of antennas.

The communication manager 915 may identify a multicast transmission for a set of user equipments (UEs), determine, based on a quantity of the set of UEs, an open loop power control parameter for feedback transmissions responsive to multicast transmissions, and transmit (e.g., in cooperation with the transmitter 920), to the UEs, the multicast transmission and an indication of the open loop power control parameter. The communication manager 915 may be an example of aspects of the communication manager 1210 described herein.

The communication manager 915, or its sub-components, may be implemented in hardware, code (e.g., software or firmware) executed by a processor, or any combination thereof. If implemented in code executed by a processor, the functions of the communication manager 915, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communication manager 915, or its sub-components, may be physically located at various positions, including being distributed such that portions of functions are implemented at different physical locations by one or more physical components. In some examples, the communication manager 915, or its sub-components, may be a separate and distinct component in accordance with various aspects of the present disclosure. In some examples, the communication manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
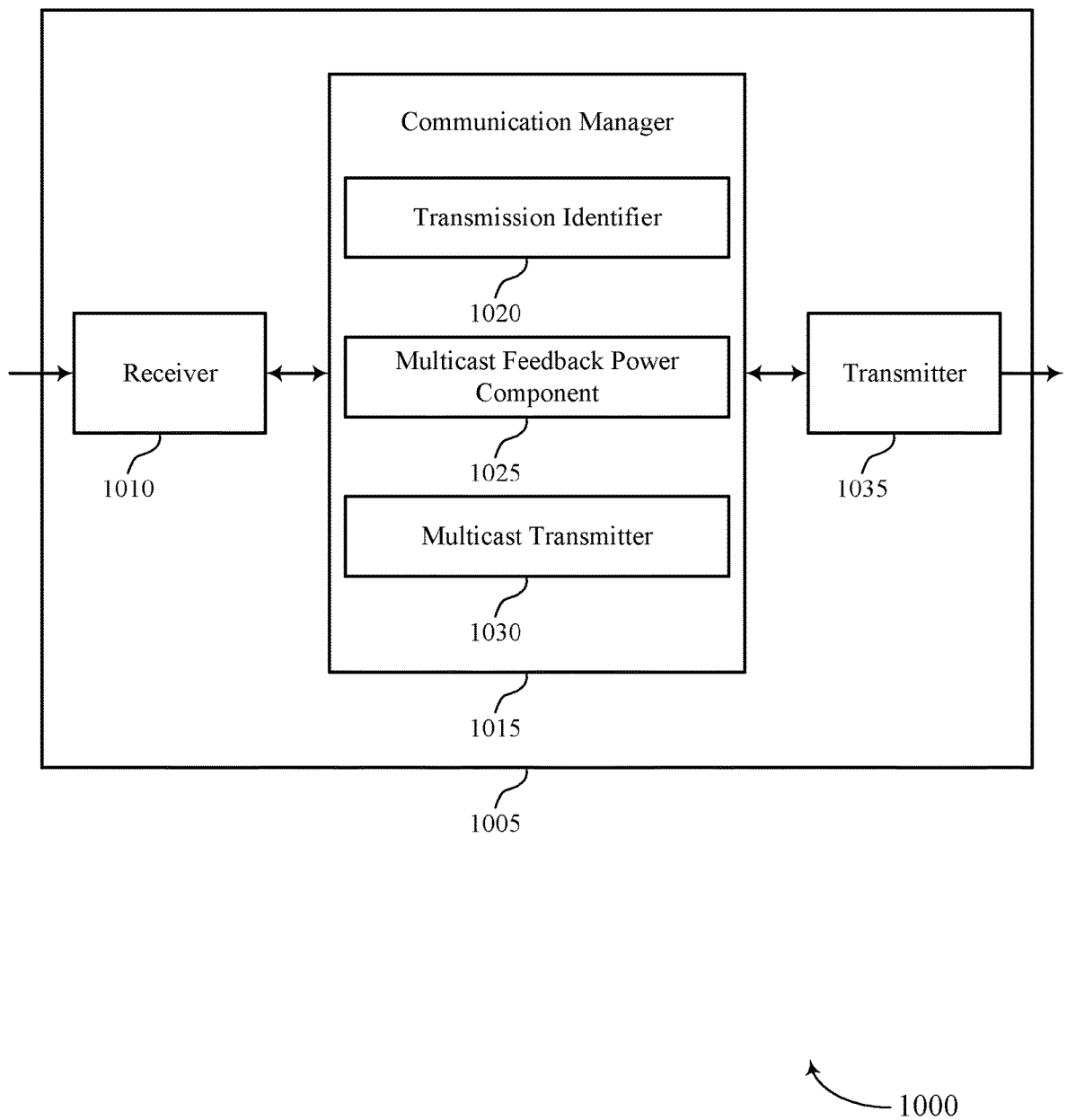

FIG. 10 shows a block diagram 1000 of a device 1005 that supports open loop feedback power control for multicast transmissions in accordance with aspects of the present disclosure. The device 1005 may be an example of aspects of a device 905, or a base station 105 as described herein. The device 1005 may include a receiver 1010, a communication manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to open loop feedback power control for multicast transmissions, etc.). Information may be passed on to other components of the device 1005. The receiver 1010 may be an example of aspects of the transceiver 1220 described with reference to FIG. 12. The receiver 1010 may utilize a single antenna or a set of antennas.

The communication manager 1015 may be an example of aspects of the communication manager 915 as described herein. The communication manager 1015 may include a transmission identifier 1020, a multicast feedback power component 1025, and a multicast transmitter 1030. The communication manager 1015 may be an example of aspects of the communication manager 1210 described herein.

The transmission identifier 1020 may identify a multicast transmission for a set of user equipments (UEs).

The multicast feedback power component 1025 may determine, based on a quantity of the set of UEs, an open loop power control parameter for feedback transmissions responsive to multicast transmissions.

The multicast transmitter 1030 may transmit (e.g., in cooperation with the transmitter 1035), to the UEs, the multicast transmission and an indication of the open loop power control parameter.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
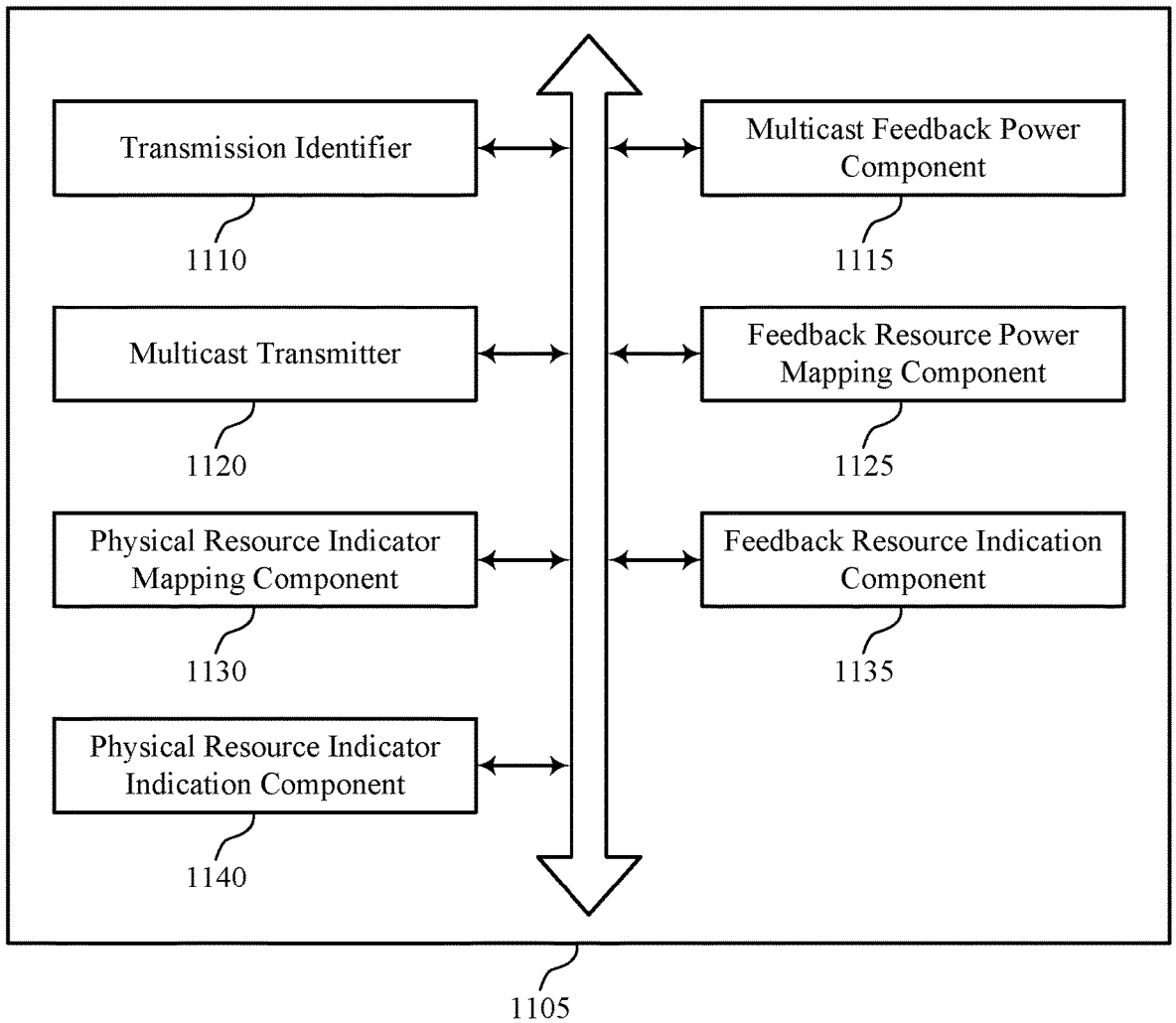
FIG. 11 shows a block diagram of a communication manager that supports open loop feedback power control for multicast transmissions in accordance with aspects of the present disclosure.

FIG. 11 shows a block diagram 1100 of a communication manager 1105 that supports open loop feedback power control for multicast transmissions in accordance with aspects of the present disclosure. The communication manager 1105 may be an example of aspects of a communication manager 915, a communication manager 1015, or a communication manager 1210 described herein. The communication manager 1105 may include a transmission identifier 1110, a multicast feedback power component 1115, a multicast transmitter 1120. a feedback resource power mapping component 1125, a physical resource indicator mapping component 1130, a feedback resource indication component 1135, and a physical resource indicator indication component 1140. Each of these modules may communicate, directly or indirectly, with one another (e.g., via one or more buses).

The transmission identifier 1110 may identify a multicast transmission for a set of user equipments (UEs).

The multicast feedback power component 1115 may determine, based on a quantity of the set of UEs, an open loop power control parameter for feedback transmissions responsive to multicast transmissions.

In some examples, the multicast feedback power component 1115 may determine a first open loop power control parameter for the first set of UEs based on a quantity of the first set of UEs.

In some examples, the multicast feedback power component 1115 may determine a second open loop power control parameter for the second set of UEs based on a quantity of the second set of UEs.

In some cases, the open loop power control parameter is associated with feedback transmissions responsive to only multicast transmissions.

In some cases, the open loop power control parameter for feedback transmissions responsive to multicast transmissions is different than a unicast open loop power control parameter.

In some cases, the open loop power control parameter is associated with feedback transmissions responsive to a multicast transmission and a unicast transmission.

In some cases, the open loop power control parameter is associated with negative acknowledgment feedback.

The multicast transmitter 1120 may transmit, to the UEs, the multicast transmission and an indication of the open loop power control parameter.

The feedback resource power mapping component 1125 may identify a configuration for a set of open loop power control parameters each corresponding to a respective feedback resource.

The physical resource indicator mapping component 1130 may identify a configuration for a set of open loop power control parameters each corresponding to a respective physical resource indicator.

The feedback resource indication component 1135 may transmit an indication of a respective feedback resource corresponding to the open loop power control parameter.

The physical resource indicator indication component 1140 may transmit, in downlink control information corresponding to a multicast transmission, an indication of a respective physical resource indicator corresponding to the open loop power control parameter.

Figure 12:
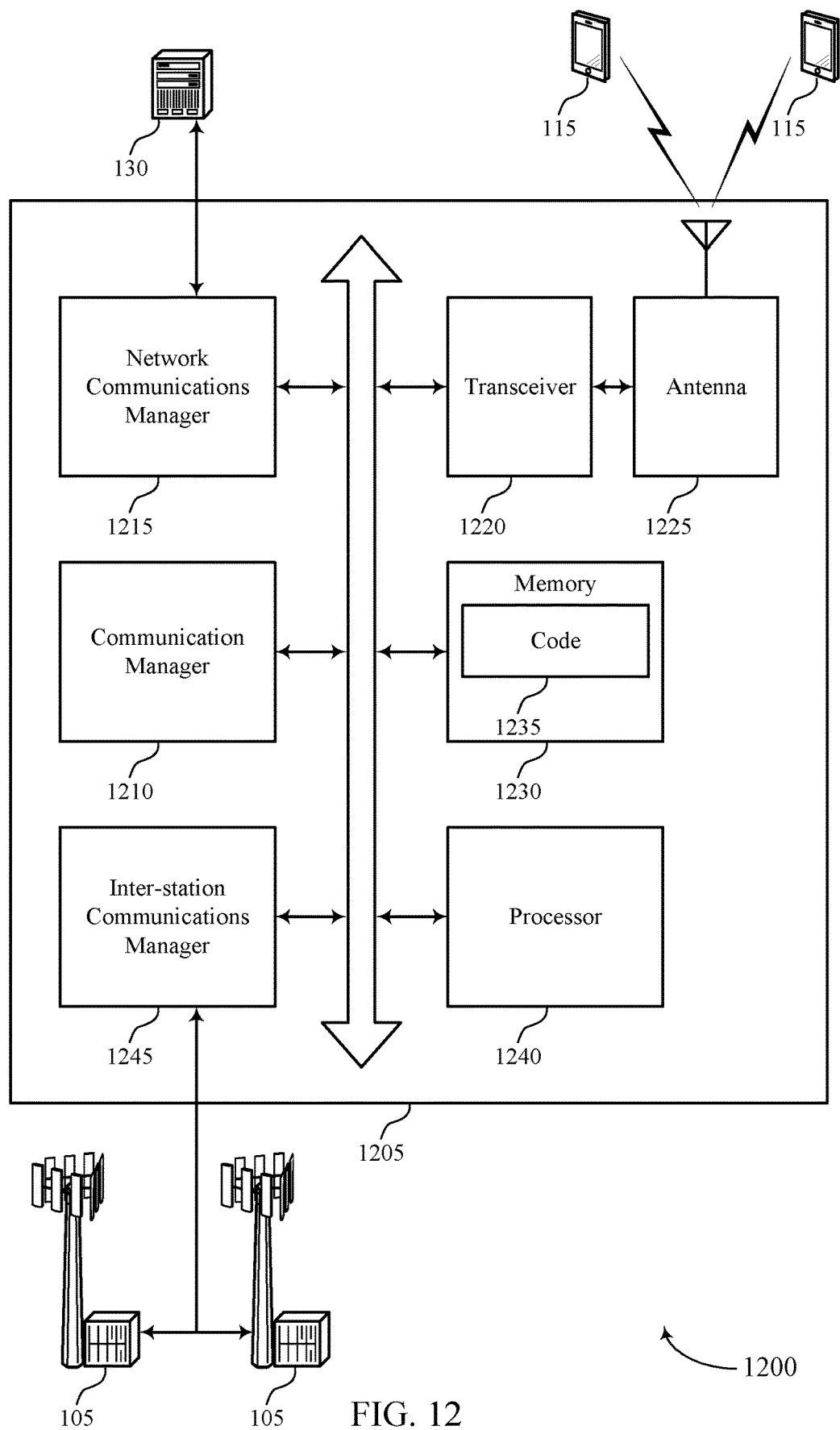
FIG. 12 shows a diagram of a system including a device that supports open loop feedback power control for multicast transmissions in accordance with aspects of the present disclosure.

FIG. 12 shows a diagram of a system 1200 including a device 1205 that supports open loop feedback power control for multicast transmissions in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communication manager 1210, a network communications manager 1215, a transceiver 1220, an antenna 1225, memory 1230, a processor 1240, and an inter-station communications manager 1245. These components may be in electronic communication via one or more buses.

The communication manager 1210 may identify a multicast transmission for a set of user equipments (UEs), determine, based on a quantity of the set of UEs, an open loop power control parameter for feedback transmissions responsive to multicast transmissions, and transmit (e.g., in cooperation with the transceiver 1220), to the UEs, the multicast transmission and an indication of the open loop power control parameter.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting open loop feedback power control for multicast transmissions).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

Figure 13:
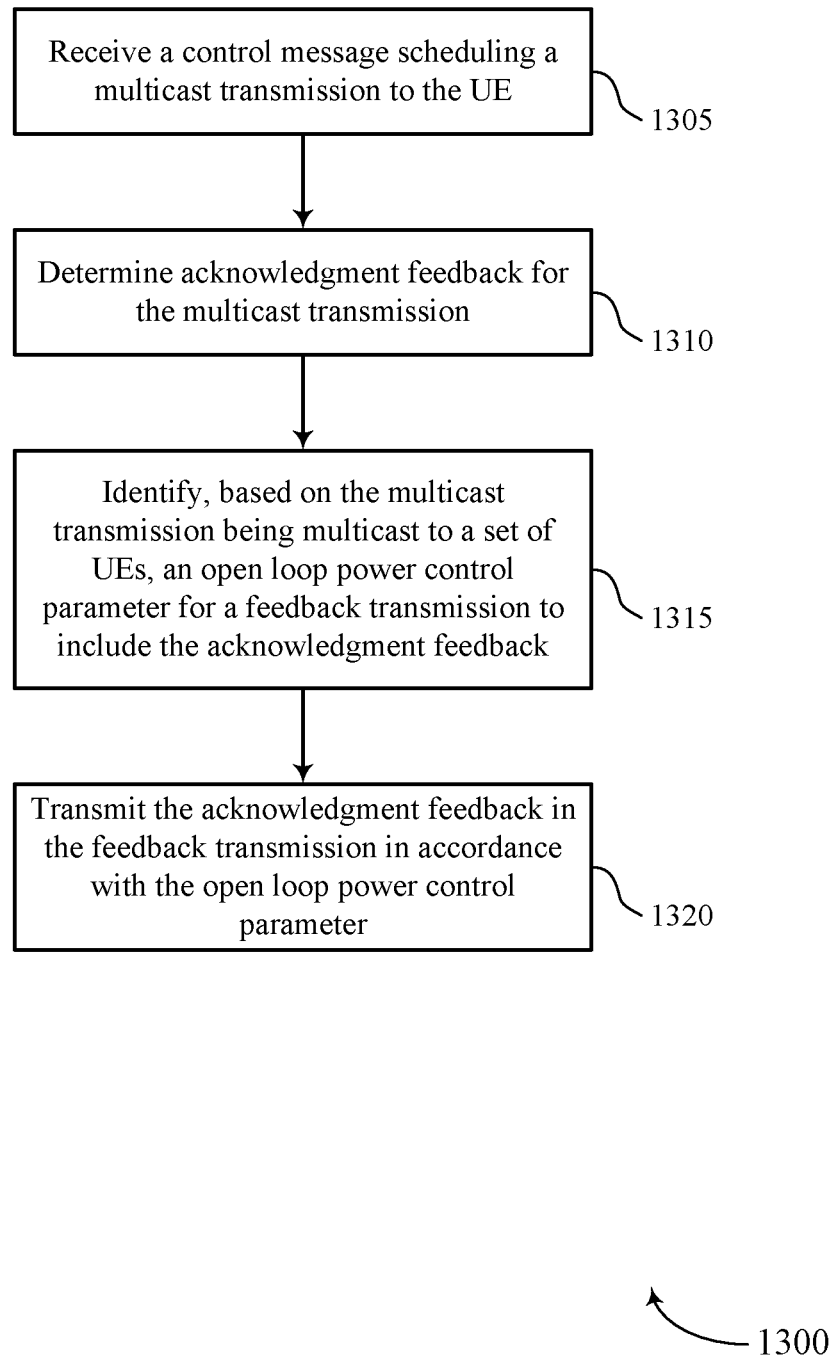
FIGS. 13 through 19 show flowcharts illustrating methods that support open loop feedback power control for multicast transmissions in accordance with aspects of the present disclosure.

FIG. 13 shows a flowchart illustrating a method 1300 that supports open loop feedback power control for multicast transmissions in accordance with aspects of the present disclosure. The operations of method 1300 may be implemented by a UE 115 or its components as described herein. For example, the operations of method 1300 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1305, the UE may receive a control message scheduling a multicast transmission to the UE. The operations of 1305 may be performed according to the methods described herein. In some examples, aspects of the operations of 1305 may be performed by a control message receiver as described with reference to FIGS. 5 through 8.

At 1310, the UE may determine acknowledgment feedback for the multicast transmission. The operations of 1310 may be performed according to the methods described herein. In some examples, aspects of the operations of 1310 may be performed by a reception evaluator as described with reference to FIGS. 5 through 8.

At 1315, the UE may identify, based on the multicast transmission being multicast to a set of UEs, an open loop power control parameter for a feedback transmission to include the acknowledgment feedback. The operations of 1315 may be performed according to the methods described herein. In some examples, aspects of the operations of 1315 may be performed by a feedback power component as described with reference to FIGS. 5 through 8.

At 1320, the UE may transmit the acknowledgment feedback in the feedback transmission in accordance with the open loop power control parameter. The operations of 1320 may be performed according to the methods described herein. In some examples, aspects of the operations of 1320 may be performed by a feedback transmitter as described with reference to FIGS. 5 through 8.

Figure 14:
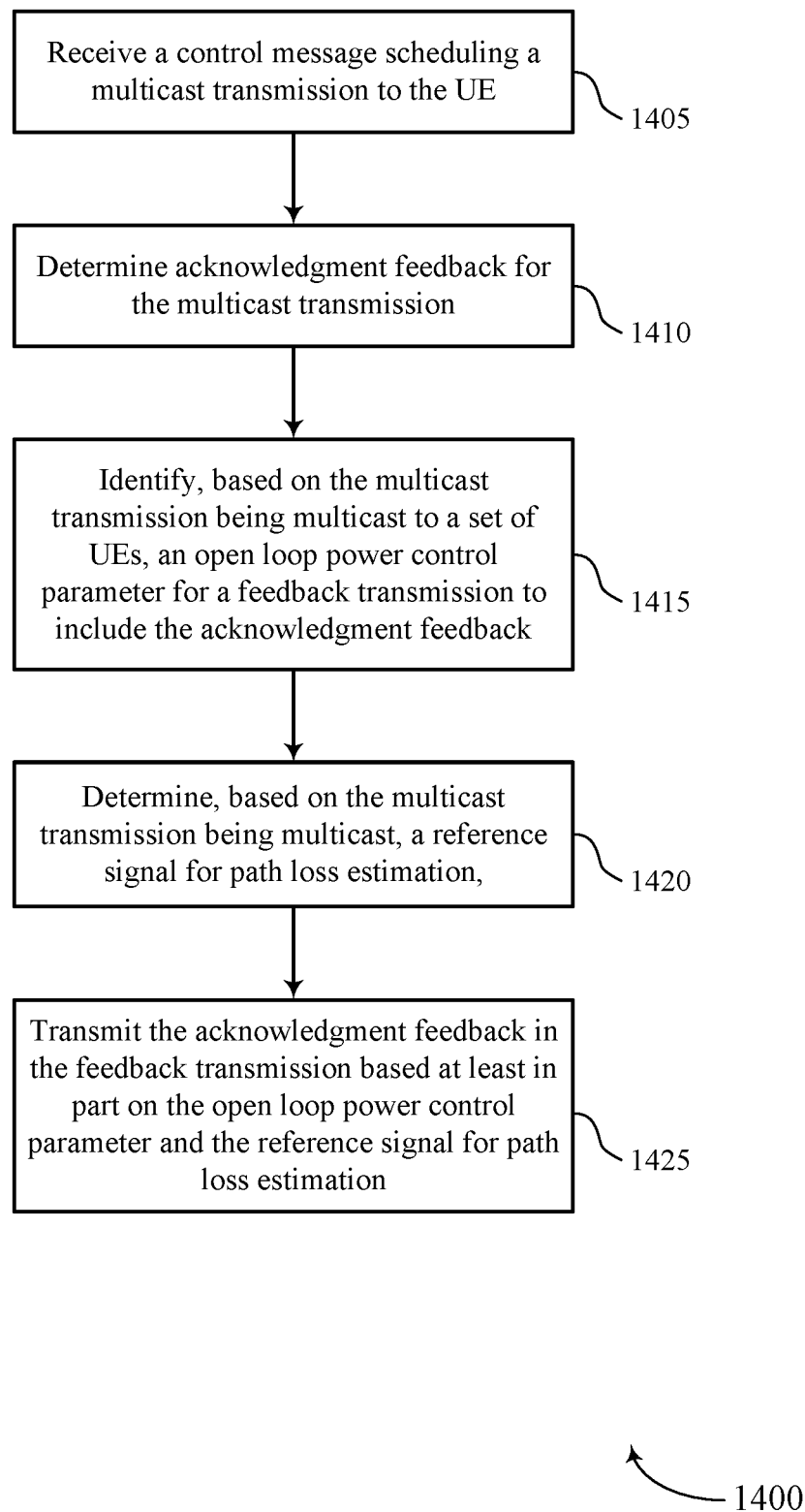

FIG. 14 shows a flowchart illustrating a method 1400 that supports open loop feedback power control for multicast transmissions in accordance with aspects of the present disclosure. The operations of method 1400 may be implemented by a UE 115 or its components as described herein. For example, the operations of method 1400 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1405, the UE may receive a control message scheduling a multicast transmission to the UE. The operations of 1405 may be performed according to the methods described herein. In some examples, aspects of the operations of 1405 may be performed by a control message receiver as described with reference to FIGS. 5 through 8.

At 1410, the UE may determine acknowledgment feedback for the multicast transmission. The operations of 1410 may be performed according to the methods described herein. In some examples, aspects of the operations of 1410 may be performed by a reception evaluator as described with reference to FIGS. 5 through 8.

At 1415, the UE may identify, based on the multicast transmission being multicast to a set of UEs, an open loop power control parameter for a feedback transmission to include the acknowledgment feedback. The operations of 1415 may be performed according to the methods described herein. In some examples, aspects of the operations of 1415 may be performed by a feedback power component as described with reference to FIGS. 5 through 8.

At 1420, the UE may determine, based on the multicast transmission being multicast, a reference signal for path loss estimation. The operations of 1420 may be performed according to the methods described herein. In some examples, aspects of the operations of 1420 may be performed by a reference signal identifier as described with reference to FIGS. 5 through 8.

At 1425, the UE may transmit the acknowledgment feedback in the feedback transmission based at least in part on the open loop power control parameter and the reference signal for path loss estimation. The operations of 1425 may be performed according to the methods described herein. In some examples, aspects of the operations of 1425 may be performed by a feedback transmitter as described with reference to FIGS. 5 through 8.

Figure 15:
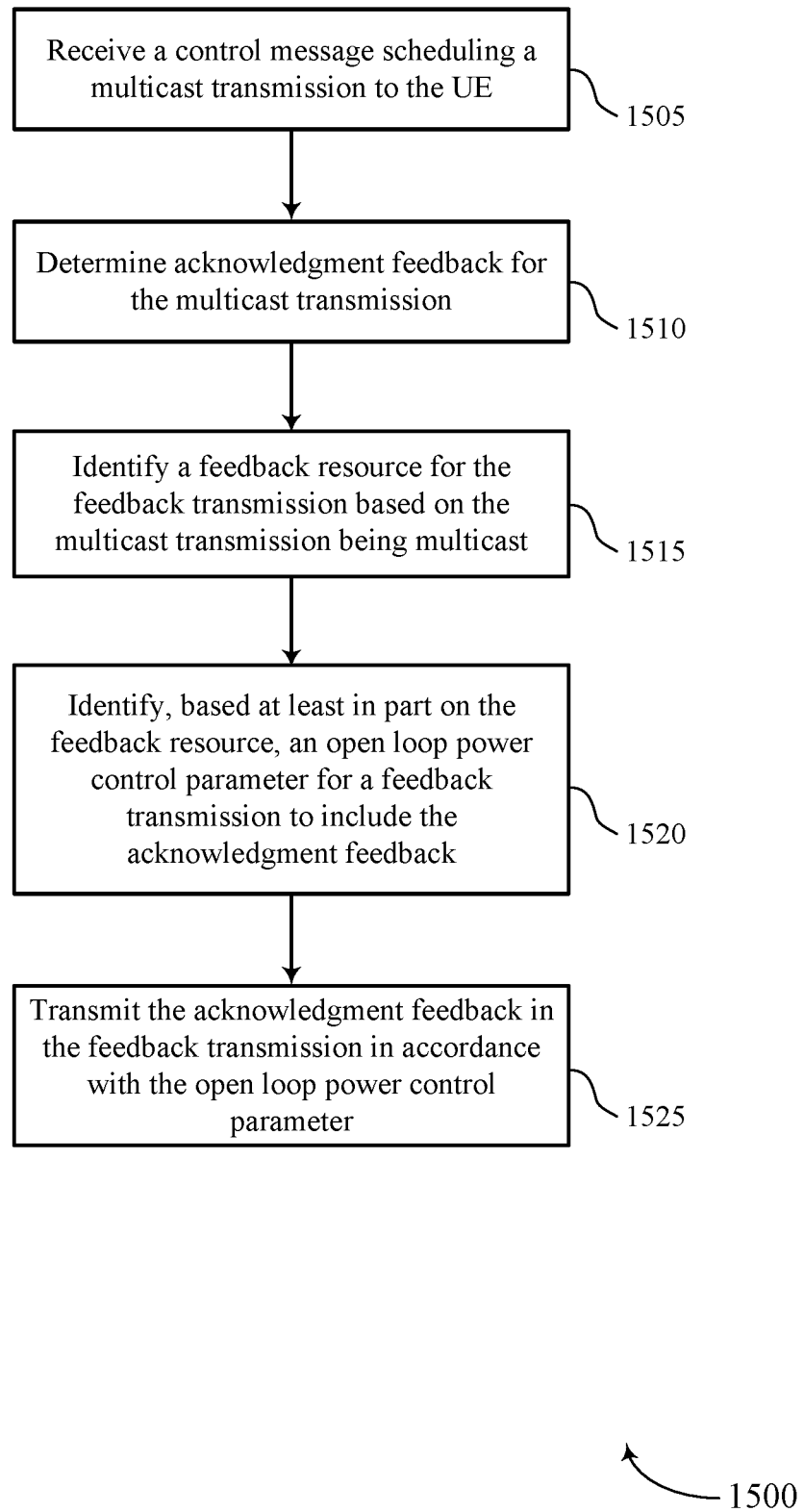

FIG. 15 shows a flowchart illustrating a method 1500 that supports open loop feedback power control for multicast transmissions in accordance with aspects of the present disclosure. The operations of method 1500 may be implemented by a UE 115 or its components as described herein. For example, the operations of method 1500 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1505, the UE may receive a control message scheduling a multicast transmission to the UE. The operations of 1505 may be performed according to the methods described herein. In some examples, aspects of the operations of 1505 may be performed by a control message receiver as described with reference to FIGS. 5 through 8.

At 1510, the UE may determine acknowledgment feedback for the multicast transmission. The operations of 1510 may be performed according to the methods described herein. In some examples, aspects of the operations of 1510 may be performed by a reception evaluator as described with reference to FIGS. 5 through 8.

At 1515, the UE may identify a feedback resource for the feedback transmission based on the multicast transmission being multicast. The operations of 1515 may be performed according to the methods described herein. In some examples, aspects of the operations of 1515 may be performed by a feedback resource identifier as described with reference to FIGS. 5 through 8.

At 1520, the UE may identify, based at least in part on the feedback resource, an open loop power control parameter for a feedback transmission to include the acknowledgment feedback. The operations of 1520 may be performed according to the methods described herein. In some examples, aspects of the operations of 1520 may be performed by a feedback power component as described with reference to FIGS. 5 through 8.

At 1525, the UE may transmit the acknowledgment feedback in the feedback transmission in accordance with the open loop power control parameter. The operations of 1525 may be performed according to the methods described herein. In some examples, aspects of the operations of 1525 may be performed by a feedback transmitter as described with reference to FIGS. 5 through 8.

Figure 16:
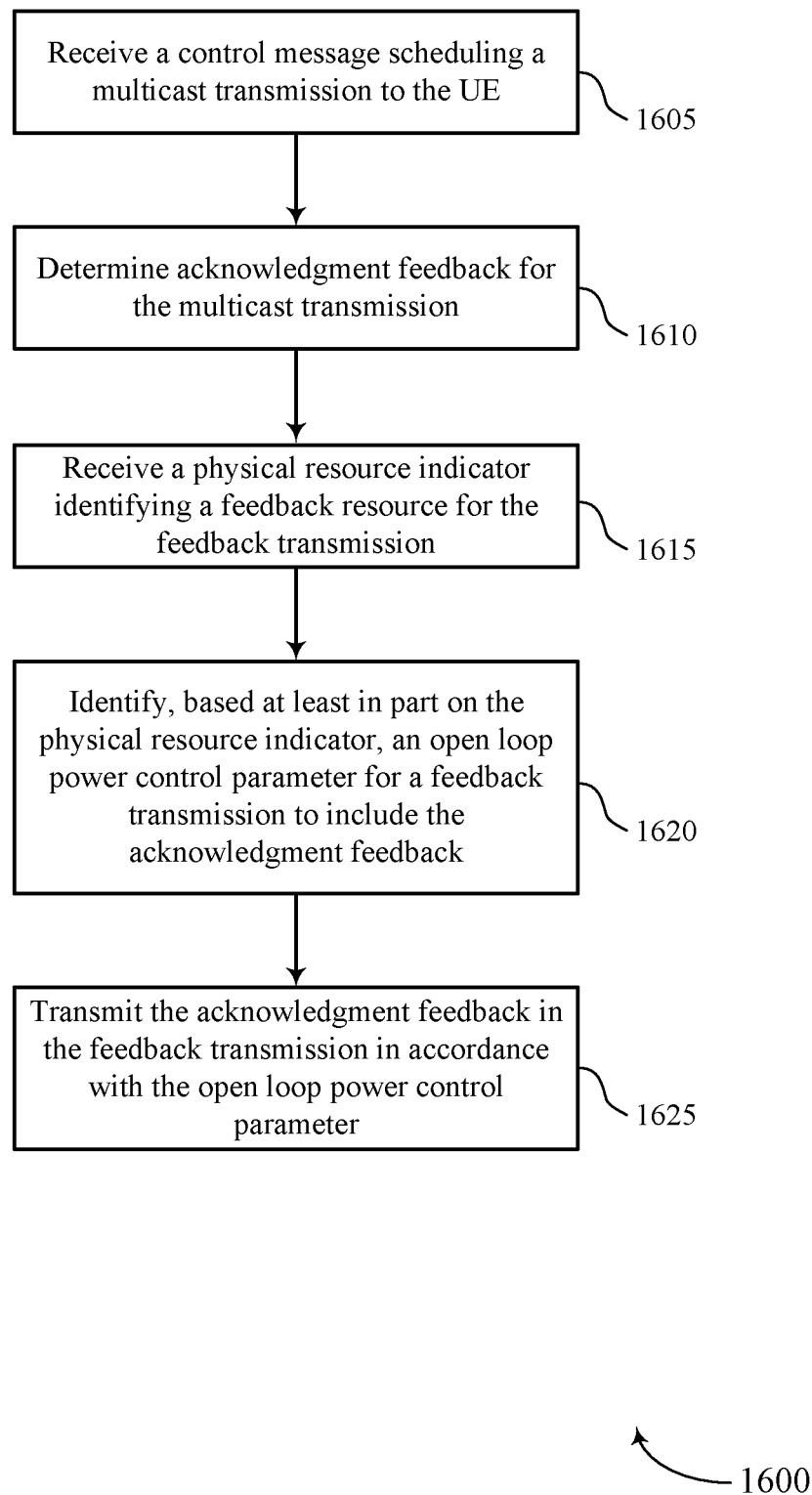

FIG. 16 shows a flowchart illustrating a method 1600 that supports open loop feedback power control for multicast transmissions in accordance with aspects of the present disclosure. The operations of method 1600 may be implemented by a UE 115 or its components as described herein. For example, the operations of method 1600 may be performed by a communication manager as described with reference to FIGS. 5 through 8. In some examples, a UE may execute a set of instructions to control the functional elements of the UE to perform the described functions. Additionally or alternatively, a UE may perform aspects of the described functions using special-purpose hardware.

At 1605, the UE may receive a control message scheduling a multicast transmission to the UE. The operations of 1605 may be performed according to the methods described herein. In some examples, aspects of the operations of 1605 may be performed by a control message receiver as described with reference to FIGS. 5 through 8.

At 1610, the UE may determine acknowledgment feedback for the multicast transmission. The operations of 1610 may be performed according to the methods described herein. In some examples, aspects of the operations of 1610 may be performed by a reception evaluator as described with reference to FIGS. 5 through 8.

At 1615, the UE may receive a physical resource indicator identifying a feedback resource for the feedback transmission. The operations of 1615 may be performed according to the methods described herein. In some examples, aspects of the operations of 1615 may be performed by a control message receiver as described with reference to FIGS. 5 through 8.

At 1620, the UE may identify, based at least in part on the physical resource indicator, an open loop power control parameter for a feedback transmission to include the acknowledgment feedback. The operations of 1620 may be performed according to the methods described herein. In some examples, aspects of the operations of 1620 may be performed by a feedback power component as described with reference to FIGS. 5 through 8.

At 1625, the UE may transmit the acknowledgment feedback in the feedback transmission in accordance with the open loop power control parameter. The operations of 1625 may be performed according to the methods described herein. In some examples, aspects of the operations of 1625 may be performed by a feedback transmitter as described with reference to FIGS. 5 through 8.

Figure 17:
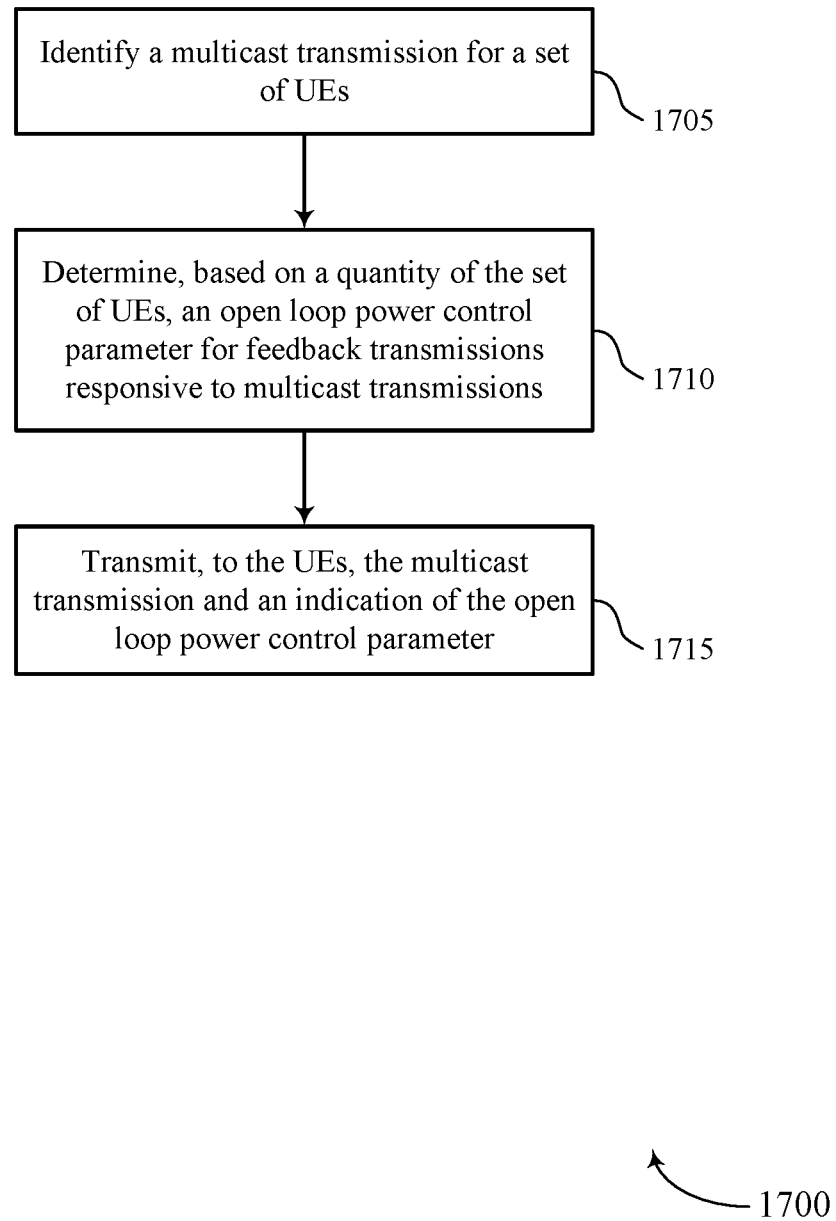

FIG. 17 shows a flowchart illustrating a method 1700 that supports open loop feedback power control for multicast transmissions in accordance with aspects of the present disclosure. The operations of method 1700 may be implemented by a base station 105 or its components as described herein. For example, the operations of method 1700 may be performed by a communication manager as described with reference to FIGS. 9 through 12. In some examples, a base station may execute a set of instructions to control the functional elements of the base station to perform the described functions. Additionally or alternatively, a base station may perform aspects of the described functions using special-purpose hardware.

At 1705, the base station may identify a multicast transmission for a set of UEs. The operations of 1705 may be performed according to the methods described herein. In some examples, aspects of the operations of 1705 may be performed by a transmission identifier as described with reference to FIGS. 9 through 12.

At 1710, the base station may determine, based on a quantity of the set of UEs, an open loop power control parameter for feedback transmissions responsive to multicast transmissions. The operations of 1710 may be performed according to the methods described herein. In some examples, aspects of the operations of 1710 may be performed by a multicast feedback power component as described with reference to FIGS. 9 through 12.

At 1715, the base station may transmit, to the UEs, the multicast transmission and an indication of the open loop power control parameter. The operations of 1715 may be performed according to the methods described herein. In some examples, aspects of the operations of 1715 may be performed by a multicast transmitter as described with reference to FIGS. 9 through 12.

Figure 18:
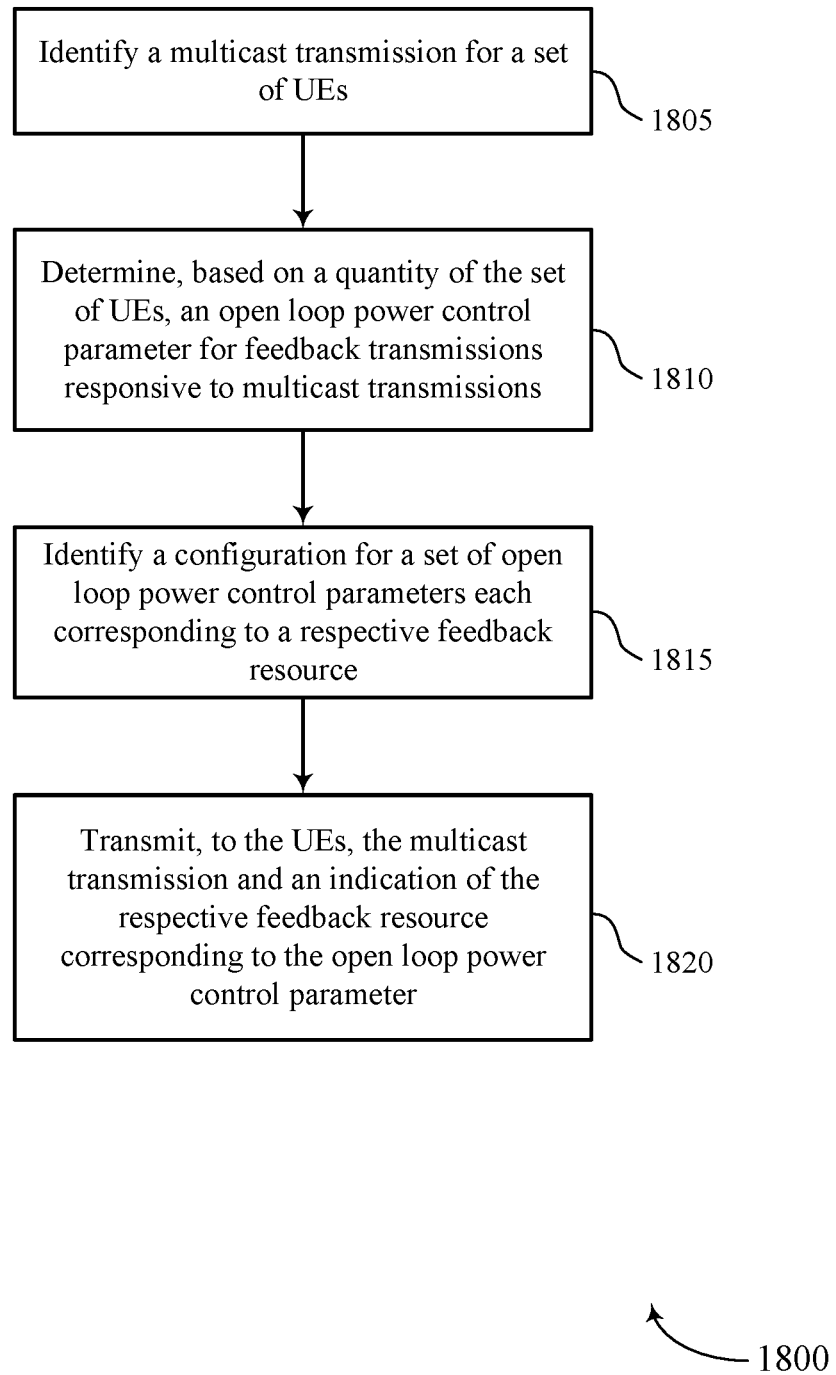

FIG. 18 shows a flowchart illustrating a method 1800 that supports open loop feedback power control for multicast transmissions in accordance with aspects of the present disclosure. The operations of method 1800 may be implemented by a base station 105 or its components as described herein. For example, the operations of method 1800 may be performed by a communication manager as described with reference to FIGS. 9 through 12. In some examples, a base station may execute a set of instructions to control the functional elements of the base station to perform the described functions. Additionally or alternatively, a base station may perform aspects of the described functions using special-purpose hardware.

At 1805, the base station may identify a multicast transmission for a set of UEs. The operations of 1805 may be performed according to the methods described herein. In some examples, aspects of the operations of 1805 may be performed by a transmission identifier as described with reference to FIGS. 9 through 12.

At 1810, the base station may determine, based on a quantity of the set of UEs, an open loop power control parameter for feedback transmissions responsive to multicast transmissions. The operations of 1810 may be performed according to the methods described herein. In some examples, aspects of the operations of 1810 may be performed by a multicast feedback power component as described with reference to FIGS. 9 through 12.

At 1815, the base station may identify a configuration for a set of open loop power control parameters each corresponding to a respective feedback resource. The operations of 1815 may be performed according to the methods described herein. In some examples, aspects of the operations of 1815 may be performed by a feedback resource power mapping component as described with reference to FIGS. 9 through 12.

At 1820, the base station may transmit, to the UEs, the multicast transmission and an indication of the respective feedback resource corresponding to the open loop power control parameter. The operations of 1820 may be performed according to the methods described herein. In some examples, aspects of the operations of 1820 may be performed by a multicast transmitter or a feedback resource indication component as described with reference to FIGS. 9 through 12.

Figure 19:
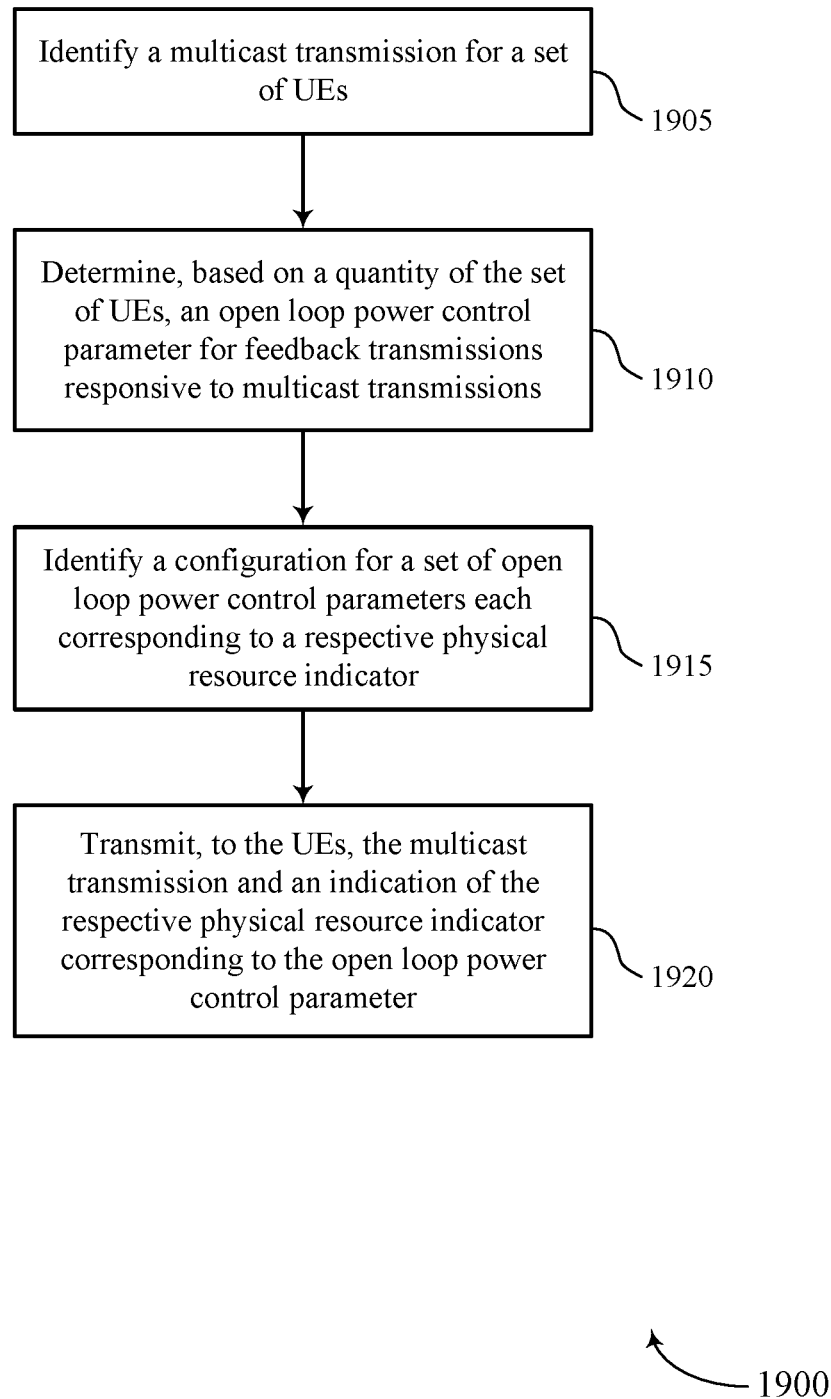

FIG. 19 shows a flowchart illustrating a method 1900 that supports open loop feedback power control for multicast transmissions in accordance with aspects of the present disclosure. The operations of method 1900 may be implemented by a base station 105 or its components as described herein. For example, the operations of method 1900 may be performed by a communication manager as described with reference to FIGS. 9 through 12. In some examples, a base station may execute a set of instructions to control the functional elements of the base station to perform the described functions. Additionally or alternatively, a base station may perform aspects of the described functions using special-purpose hardware.

At 1905, the base station may identify a multicast transmission for a set of UEs. The operations of 1905 may be performed according to the methods described herein. In some examples, aspects of the operations of 1905 may be performed by a transmission identifier as described with reference to FIGS. 9 through 12.

At 1910, the base station may determine, based on a quantity of the set of UEs, an open loop power control parameter for feedback transmissions responsive to multicast transmissions. The operations of 1910 may be performed according to the methods described herein. In some examples, aspects of the operations of 1910 may be performed by a multicast feedback power component as described with reference to FIGS. 9 through 12.

At 1915, the base station may identify a configuration for a set of open loop power control parameters each corresponding to a respective physical resource indicator. The operations of 1915 may be performed according to the methods described herein. In some examples, aspects of the operations of 1915 may be performed by a physical resource indicator mapping component as described with reference to FIGS. 9 through 12.

At 1920, the base station may transmit, to the UEs, the multicast transmission and an indication of the respective physical resource indicator corresponding to the open loop power control parameter (e.g., in downlink control information corresponding to the multicast transmission). The operations of 1920 may be performed according to the methods described herein. In some examples, aspects of the operations of 1920 may be performed by a multicast transmitter or a physical resource indicator indication component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of examples of the present invention:

Example 1: A method for wireless communication, comprising: receiving, at a UE, a control message scheduling a multicast transmission to the UE; determining acknowledgment feedback for the multicast transmission at the UE; identifying, based at least in part on the multicast transmission being multicast to a plurality of UEs, an open loop power control parameter for a feedback transmission to include the acknowledgment feedback; and transmitting the acknowledgment feedback in the feedback transmission in accordance with the open loop power control parameter.

Example 2: The method of example 1, further comprising: determining, based at least in part on the multicast transmission being multicast, a reference signal for path loss estimation, wherein transmitting the feedback transmission is based at least in part on the open loop power control parameter and the reference signal for path loss estimation.

Example 3: The method of any one of examples 1 or 2, wherein identifying the open loop power control parameter comprises: determining the open loop power control parameter based at least in part on the feedback transmission including feedback for only multicast transmissions.

Example 4: The method of example 3, wherein the open loop power control parameter determined based at least in part on the feedback transmission including feedback for only multicast transmissions is different than a unicast open loop power control parameter.

Example 5: The method of any one of examples 1 or 2, wherein identifying the open loop power control parameter comprises: determining the open loop power control parameter based at least in part on the feedback transmission including feedback for a multicast transmissions and a unicast transmission.

Example 6: The method of any one of examples 1 through 5, wherein the control message is received in a downlink control channel, the method further comprising: determining that the multicast transmission is multicast based at least in part on a radio network temporary identifier associated with the downlink control channel.

Example 7: The method of any one of examples 1 through 6, wherein identifying the open loop power control parameter and transmitting the acknowledgment feedback in the feedback transmission are based at least in part on the acknowledgment feedback being a negative acknowledgement.

Example 8: The method of any one of examples 1 through 7, wherein identifying the open loop power control parameter comprises: identifying a feedback resource for the feedback transmission based at least in part on the multicast transmission being multicast; and determining the open loop power control parameter based at least in part on the feedback resource.

Example 9: The method of any one of examples 1 through 7, wherein identifying the open loop power control parameter comprises: receiving a physical resource indicator identifying a feedback resource for the feedback transmission; and determining the open loop power control parameter based at least in part on the physical resource indicator.

Example 10: The method of example 9, further comprising: determining a reference signal for path loss estimation based at least in part on the physical resource indicator, wherein transmitting the feedback transmission is based at least in part on the open loop power control parameter and the reference signal for path loss estimation.

Example 11: An apparatus for wireless communication comprising at least one means for performing a method of any one of examples 1 through 10.

Example 12: An apparatus for wireless communication comprising a processor and memory coupled to the processor, the processor and memory configured to perform a method of any one of examples 1 through 10.

Example 14: A non-transitory computer-readable medium storing code for wireless communication for wireless communication the code comprising instructions executable by a processor to perform a method of any one of examples 1 through 10.

Example 15: A method for wireless communication, comprising: identifying a multicast transmission for a plurality of UEs; determining, based at least in part on a quantity of the plurality of UEs, an open loop power control parameter for feedback transmissions responsive to multicast transmissions; and transmitting, to the UEs, the multicast transmission and an indication of the open loop power control parameter.

Example 16: The method of example 15, wherein the plurality of UEs comprises a first set of UEs and a second set of UEs, and wherein the determining comprises: determining a first open loop power control parameter for the first set of UEs based at least in part on a quantity of the first set of UEs; and determining a second open loop power control parameter for the second set of UEs based at least in part on a quantity of the second set of UEs.

Example 17: The method of any one of examples 15 or 16, further comprising: identifying a configuration for a set of open loop power control parameters each corresponding to a respective feedback resource, wherein transmitting the indication of the open loop power control parameter comprises transmitting an indication of the respective feedback resource corresponding to the open loop power control parameter.

Example 18: The method of any one of examples 15 or 16, further comprising: identifying a configuration for a set of open loop power control parameters each corresponding to a respective physical resource indicator, wherein transmitting the indication of the open loop power control parameter comprises transmitting, in downlink control information corresponding to the multicast transmission, an indication of the respective physical resource indicator corresponding to the open loop power control parameter.

Example 19: The method of any one of examples 15 through 18, wherein the open loop power control parameter is associated with feedback transmissions responsive to only multicast transmissions.

Example 20: The method of any one of examples 15 through 18, wherein the open loop power control parameter for feedback transmissions responsive to multicast transmissions is different than a unicast open loop power control parameter.

Example 21: The method of any one of examples 15 through 18, wherein the open loop power control parameter is associated with feedback transmissions responsive to a multicast transmission and a unicast transmission.

Example 22: The method of any one of examples 15 through 21, wherein the open loop power control parameter is associated with negative acknowledgment feedback.

Example 23: An apparatus for wireless communication comprising at least one means for performing a method of any one of examples 15 through 22.

Example 24: An apparatus for wireless communication comprising a processor and memory coupled to the processor, the processor and memory configured to perform a method of any one of examples 15 through 22.

Example 26: A non-transitory computer-readable medium storing code for wireless communication for wireless communication the code comprising instructions executable by a processor to perform a method of any one of examples 15 through 22.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, at a user equipment (UE), a control message scheduling a multicast transmission to the UE;
   determining acknowledgment feedback for the multicast transmission at the UE;
   identifying, based at least in part on the multicast transmission being multicast to a plurality of UEs, an open loop power control parameter for a feedback transmission to include the acknowledgment feedback, wherein the open loop power control parameter is different than a unicast open loop power control parameter; and
   transmitting the acknowledgment feedback in the feedback transmission in accordance with the open loop power control parameter.

2. The method of claim 1, further comprising:
   determining, based at least in part on the multicast transmission being multicast, a reference signal for path loss estimation,
   wherein transmitting the feedback transmission is based at least in part on the open loop power control parameter and the reference signal for path loss estimation.

3. The method of claim 1, wherein identifying the open loop power control parameter comprises:
   determining the open loop power control parameter based at least in part on the feedback transmission including feedback for only multicast transmissions.

4. The method of claim 1, wherein identifying the open loop power control parameter comprises:
   determining the open loop power control parameter based at least in part on the feedback transmission including feedback for a multicast transmissions and a unicast transmission.

5. The method of claim 1, wherein the control message is received in a downlink control channel, the method further comprising:
   determining that the multicast transmission is multicast based at least in part on a radio network temporary identifier associated with the downlink control channel.

6. The method of claim 1, wherein identifying the open loop power control parameter and transmitting the acknowledgment feedback in the feedback transmission are based at least in part on the acknowledgment feedback being a negative acknowledgement.

7. The method of claim 1, wherein identifying the open loop power control parameter comprises:
   identifying a feedback resource for the feedback transmission based at least in part on the multicast transmission being multicast; and
   determining the open loop power control parameter based at least in part on the feedback resource.

8. The method of claim 1, wherein identifying the open loop power control parameter comprises:
   receiving a physical resource indicator identifying a feedback resource for the feedback transmission; and determining the open loop power control parameter based at least in part on the physical resource indicator.

9. The method of claim 8, further comprising:
determining a reference signal for path loss estimation based at least in part on the physical resource indicator, wherein transmitting the feedback transmission is based at least in part on the open loop power control parameter and the reference signal for path loss estimation.

10. The method of claim 1, wherein the open loop power control parameter is independent from a unicast open loop power control parameter.

11. A method for wireless communication, comprising:
identifying a multicast transmission for a plurality of user equipments (UEs);
determining, based at least in part on a quantity of the plurality of UEs, an open loop power control parameter for feedback transmissions responsive to multicast transmissions; and
transmitting, to the UEs, the multicast transmission and an indication of the open loop power control parameter.

12. The method of claim 11, wherein the plurality of UEs comprises a first set of UEs and a second set of UEs, and wherein the determining comprises:
determining a first open loop power control parameter for the first set of UEs based at least in part on a quantity of the first set of UEs; and
determining a second open loop power control parameter for the second set of UEs based at least in part on a quantity of the second set of UEs.

13. The method of claim 11, further comprising:
identifying a configuration for a set of open loop power control parameters each corresponding to a respective feedback resource,
wherein transmitting the indication of the open loop power control parameter comprises transmitting an indication of the respective feedback resource corresponding to the open loop power control parameter.

14. The method of claim 11, further comprising:
identifying a configuration for a set of open loop power control parameters each corresponding to a respective physical resource indicator,
wherein transmitting the indication of the open loop power control parameter comprises transmitting, in downlink control information corresponding to the multicast transmission, an indication of the respective physical resource indicator corresponding to the open loop power control parameter.

15. The method of claim 11, wherein the open loop power control parameter is associated with feedback transmissions responsive to only multicast transmissions.

16. The method of claim 11, wherein the open loop power control parameter for feedback transmissions responsive to multicast transmissions is different than a unicast open loop power control parameter.

17. The method of claim 11, wherein the open loop power control parameter is associated with feedback transmissions responsive to a multicast transmission and a unicast transmission.

18. The method of claim 11, wherein the open loop power control parameter is associated with negative acknowledgment feedback.

19. An apparatus for wireless communication, comprising:
a processor;
memory coupled with the processor; and
instructions stored in the memory and executable by the processor to cause the apparatus to:

receive, at a user equipment (UE), a control message scheduling a multicast transmission to the UE;
determine acknowledgment feedback for the multicast transmission at the UE;
identify, based at least in part on the multicast transmission being multicast to a plurality of UEs, an open loop power control parameter for a feedback transmission to include the acknowledgment feedback, wherein the open loop power control parameter is different than a unicast open loop power control parameter; and
transmit the acknowledgment feedback in the feedback transmission in accordance with the open loop power control parameter.

20. The apparatus of claim 19, wherein the instructions are further executable by the processor to cause the apparatus to:
determine, based at least in part on the multicast transmission being multicast, a reference signal for path loss estimation,
wherein the instructions to cause the apparatus to transmit the feedback transmission are operable based at least in part on the open loop power control parameter and the reference signal for path loss estimation.

21. The apparatus of claim 19, wherein the instructions to identify the open loop power control parameter are executable by the processor to cause the apparatus to:
determine the open loop power control parameter based at least in part on the feedback transmission including feedback for only multicast transmissions.

22. The apparatus of claim 19, wherein the instructions to identify the open loop power control parameter are executable by the processor to cause the apparatus to:
determine the open loop power control parameter based at least in part on the feedback transmission including feedback for a multicast transmissions and a unicast transmission.

23. The apparatus of claim 19, wherein the control message is received in a downlink control channel, and the instructions are further executable by the processor to cause the apparatus to:
determine that the multicast transmission is multicast based at least in part on a radio network temporary identifier associated with the downlink control channel.

24. The apparatus of claim 19, wherein the instructions to identify the open loop power control parameter and transmit the acknowledgment feedback in the feedback transmission are operable based at least in part on the acknowledgment feedback being a negative acknowledgement.

25. The apparatus of claim 19, wherein the instructions to identify the open loop power control parameter are executable by the processor to cause the apparatus to:
identify a feedback resource for the feedback transmission based at least in part on the multicast transmission being multicast; and
determine the open loop power control parameter based at least in part on the feedback resource.

26. The apparatus of claim 19, wherein the instructions to identify the open loop power control parameter are executable by the processor to cause the apparatus to:
receive a physical resource indicator identifying a feedback resource for the feedback transmission; and
determine the open loop power control parameter based at least in part on the physical resource indicator.

27. The apparatus of claim 26, wherein the instructions are further executable by the processor to cause the apparatus to:

determine a reference signal for path loss estimation based at least in part on the physical resource indicator, wherein the instructions to cause the apparatus to transmit the feedback transmission are operable based at least in part on the open loop power control parameter and the reference signal for path loss estimation.

28. The apparatus of claim 19, wherein the open loop power control parameter is independent from a unicast open loop power control parameter.

29. An apparatus for wireless communication, comprising:

a processor;

memory coupled with the processor; and instructions stored in the memory and executable by the processor to cause the apparatus to:

identify a multicast transmission for a plurality of user equipments (UEs);

determine, based at least in part on a quantity of the plurality of UEs, an open loop power control parameter for feedback transmissions responsive to multicast transmissions; and transmit, to the UEs, the multicast transmission and an indication of the open loop power control parameter.

30. The apparatus of claim 29, wherein the instructions are further executable by the processor to cause the apparatus to:

identify a configuration for a set of open loop power control parameters each corresponding to a respective feedback resource, wherein the instructions to cause the apparatus to transmit the indication of the open loop power control parameter are executable by the processor to cause the apparatus to transmit an indication of the respective feedback resource corresponding to the open loop power control parameter.

* * * * *